May 29, 1956 E. I. GROFF 2,747,523
PRETZEL TWISTING MACHINE
Filed Sept. 21, 1951 17 Sheets-Sheet 1

INVENTOR.
EDWIN I. GROFF
BY Potts and Brune
ATTORNEYS

May 29, 1956  E. I. GROFF  2,747,523
PRETZEL TWISTING MACHINE
Filed Sept. 21, 1951  17 Sheets-Sheet 2

INVENTOR.
EDWIN I. GROFF
BY Potts and Brune
ATTORNEYS

May 29, 1956 — E. I. GROFF — 2,747,523
PRETZEL TWISTING MACHINE
Filed Sept. 21, 1951 — 17 Sheets-Sheet 3

INVENTOR.
EDWIN I. GROFF
BY Potts and Bruno
ATTORNEYS

May 29, 1956 E. I. GROFF 2,747,523
PRETZEL TWISTING MACHINE
Filed Sept. 21, 1951 17 Sheets-Sheet 4

INVENTOR.
EDWIN I. GROFF
BY
ATTORNEYS

May 29, 1956  E. I. GROFF  2,747,523
PRETZEL TWISTING MACHINE
Filed Sept. 21, 1951  17 Sheets-Sheet 5

INVENTOR.
EDWIN I. GROFF
BY *Pond and Brune*
ATTORNEYS

May 29, 1956  E. I. GROFF  2,747,523
PRETZEL TWISTING MACHINE
Filed Sept. 21, 1951  17 Sheets-Sheet 6

INVENTOR.
EDWIN I. GROFF
BY Potts and Brune
ATTORNEYS

May 29, 1956  E. I. GROFF  2,747,523
PRETZEL TWISTING MACHINE
Filed Sept. 21, 1951  17 Sheets-Sheet 7

INVENTOR.
EDWIN I. GROFF
BY
ATTORNEYS

May 29, 1956 E. I. GROFF 2,747,523
PRETZEL TWISTING MACHINE
Filed Sept. 21, 1951 17 Sheets-Sheet 8

INVENTOR.
EDWIN I. GROFF
BY
ATTORNEYS

May 29, 1956 E. I. GROFF 2,747,523
PRETZEL TWISTING MACHINE
Filed Sept. 21, 1951 17 Sheets-Sheet 9
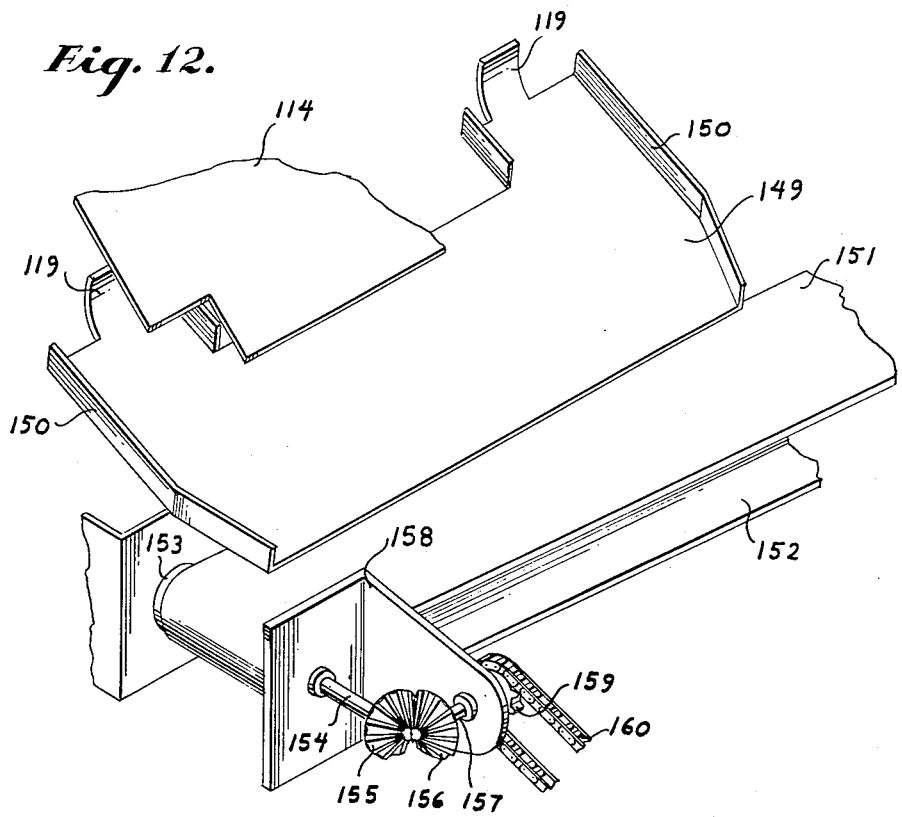
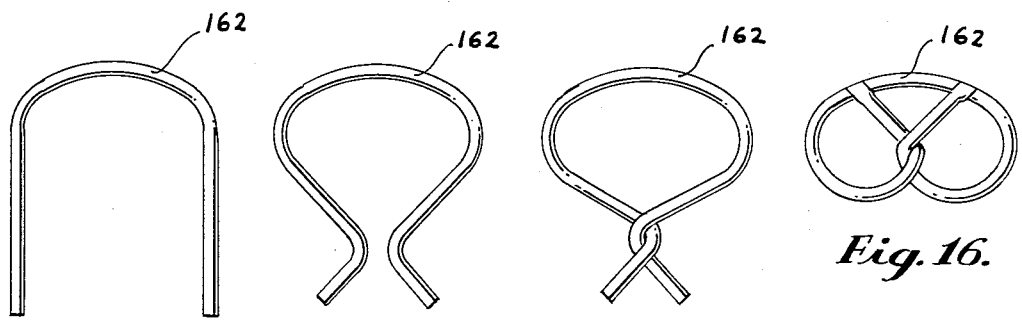
Fig. 13. Fig. 14. Fig. 15. Fig. 16.
INVENTOR.
EDWIN I. GROFF
BY
ATTORNEYS May 29, 1956   E. I. GROFF   2,747,523
PRETZEL TWISTING MACHINE
Filed Sept. 21, 1951   17 Sheets-Sheet 11

INVENTOR.
EDWIN I. GROFF
BY
Potts and Brune
ATTORNEYS

May 29, 1956 E. I. GROFF 2,747,523
PRETZEL TWISTING MACHINE
Filed Sept. 21, 1951 17 Sheets-Sheet 12

INVENTOR.
EDWIN I. GROFF
BY
Potts and Braune
ATTORNEYS

May 29, 1956 E. I. GROFF 2,747,523
PRETZEL TWISTING MACHINE
Filed Sept. 21, 1951 17 Sheets-Sheet 13

INVENTOR.
EDWIN I. GROFF
BY Potts and Bruns
ATTORNEYS

May 29, 1956  E. I. GROFF  2,747,523
PRETZEL TWISTING MACHINE
Filed Sept. 21, 1951  17 Sheets-Sheet 14

INVENTOR.
EDWIN I. GROFF
BY *Potts and Brune*
ATTORNEYS

May 29, 1956  E. I. GROFF  2,747,523
PRETZEL TWISTING MACHINE

Filed Sept. 21, 1951  17 Sheets-Sheet 15

INVENTOR.
EDWIN I. GROFF

ATTORNEYS

May 29, 1956 E. I. GROFF 2,747,523
PRETZEL TWISTING MACHINE
Filed Sept. 21, 1951 17 Sheets-Sheet 16
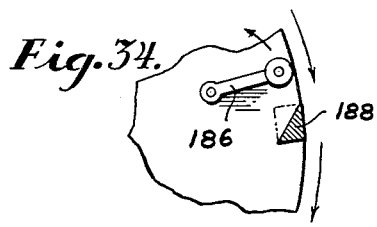
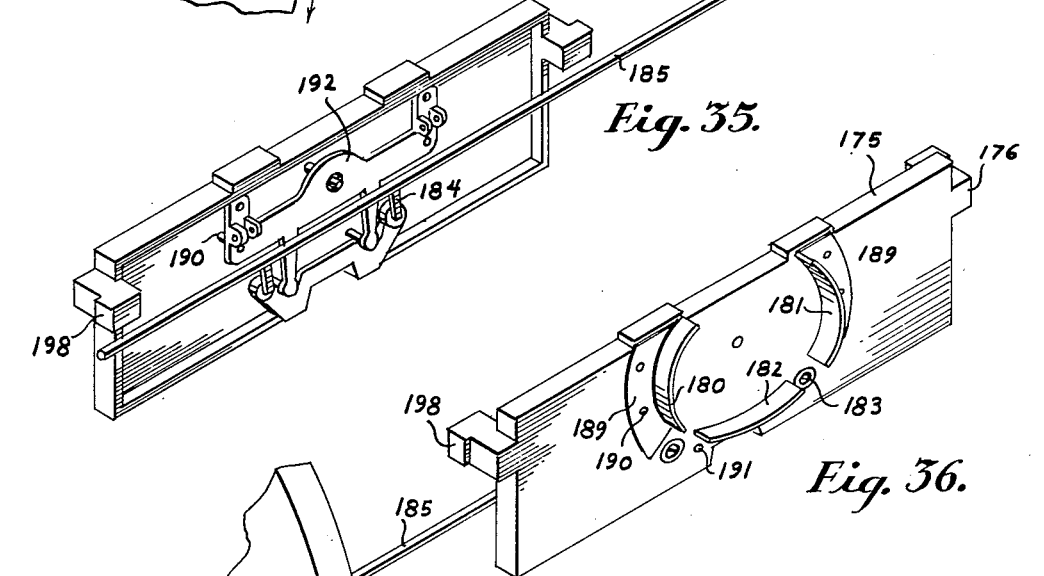
INVENTOR.
EDWIN I. GROFF
BY
Potts and Bruns
ATTORNEYS May 29, 1956 E. I. GROFF 2,747,523
PRETZEL TWISTING MACHINE
Filed Sept. 21, 1951 17 Sheets-Sheet 17

INVENTOR.
EDWIN I. GROFF
BY
ATTORNEYS

United States Patent Office 2,747,523
Patented May 29, 1956

2,747,523

PRETZEL TWISTING MACHINE

Edwin I. Groff, West Reading, Pa., assignor to Quinlan Pretzel Company, Inc., Reading, Pa., a corporation of Pennsylvania Application September 21, 1951, Serial No. 247,631

7 Claims. (Cl. 107—8)

The present invention relates to pretzel twisting machines and is concerned primarily with certain improvements which are provided for the purpose of making the operation of the machine more efficient and certain as compared to previous machines of the same general type and also to render more simple and rugged the structure of the operating parts.

A pretzel twisting machine of the general type which forms a pretzel by first imparting to a strip of dough an inverted U-shape, indenting the sides of the U, twisting the sides through a complete revolution, and then folding at the twist is disclosed in Patent Number 2,026,526, which is believed to be the first machine which operates on this principle. Patent Number 2,090,291 also issued on certain improvements in a machine of this same general type.

In the pretzel twisting machines of both of the patents above referred to, a relatively large number of so-called "forming units" were employed. Each of these machines included 30 or more of such forming units which traveled over an endless path and each of which would pick up a dough strip and then go through the cycle of shaping steps above outlined. While such machines would give fairly good performance, they were particularly objectionable in that they occupied a large amount of floor space.

In the co-pending application of Harrison S. Gipe, Serial Number 735,422, filed March 18, 1947, now Patent No. 2,628,577, dated February 17, 1953, and entitled "Pretzel Twisting Machine," which patent is owned by the assignee of this application, there is illustrated and described a pretzel twisting machine which is highly compact as compared to the machines of the earlier patents. In the machine of said Patent No. 2,628,577, the number of forming units is reduced to six which are arranged around the periphery of a drum. The machine of the present invention follows that of said Patent No. 2,628,577 in its general arrangement and compact construction.

In order to explain the exact nature of the objects and advantages of the present invention, it is necessary first to refer to the various instrumentalities which cut pieces of dough from a mass, roll them into strips and deliver them individually to the forming units. Thus, a pretzel machine of this type includes a supply hopper which receives the dough. The dough is fed by feed rollers into a pair of extruding worms which force the dough under pressure through an orifice. At the orifice a knife repeatedly cuts off pieces of dough.

In the past, considerable difficulty has been experienced with this phase of the operation. The extruding worms are positively driven and there is a considerable pressure on the dough at the orifice. As the knife heretofore used moves across the orifice it is subjected to this pressure which creates the liability of breakage. Moreover, in spite of all of the efforts which have been directed at keeping foreign objects out of the dough, such objects do get into the dough. These objects may take the form of a key, bolt, nail, or other pieces of metal, and when engaged by the knife damage results. An important object of the present invention is the provision of a new and improved knife which will obviate these conditions. This object is achieved by providing a reciprocating knife which is yieldably mounted on a horizontal axis and spring biased against the path of movement of the dough mass. Such a knife will move with the dough and will yield if it strikes hard objects. Moreover, on the return, or upstroke, the knife passes through the same opening which is formed by the cutting off of a piece of dough without exhibiting any tendency to wipe the dough back through the orifice.

After the pieces of dough are cut from the mass by the knife, they are successively delivered to the bight between a pair of endless rolling aprons. The function of these aprons is to roll the dough pieces out into elongated strips. If a pretzel twisting machine of this type is to be practical, it must be capable of high speed operation. Thus, a machine is intended to twist from 120 to 180 pretzels a minute. This means that the dough strips between the rolling aprons are fairly close together and, from the viewpoint of optimum conditions of operation, it would be desirable that they assume a parallel relation normal to the direction of movement. However, it has been found as a practical matter that when these dough strips are rolled out straight it is impossible to achieve this optimum condition. One end or the other of certain of the strips will advance or lag and destroy the parallel relation.

With this condition in mind, another highly important object of the invention is to provide a pair of rolling aprons which are shaped and arranged to roll the dough pieces into strips having a slightly bowed or arcuate shape. The center of the bow assumes a retarded position and it has been found that with this shape imparted to the dough strips they may be maintained in proper relation.

After a dough strip is rolled out it leaves the aprons and must be delivered to the forming instrumentalities. In the earlier machines, above referred to, each dough strip was simply delivered to a locality or position where it was picked up by the forming unit as it passed this position. Such an arrangement has proven to be unsatisfactory in several respects. In the first place, it has not been possible to maintain an accurate control of the dough strips and there were occasions when more than one strip would be located at the position where it is intended that one be picked up by the forming unit. Thus, the forming unit would pick up two strips and jamming would result. Then again, it has been impractical, if not impossible to insure that the dough strip would be picked up at exactly the right moment with respect to the operation of the forming unit.

The machine of this invention includes a novel assembly of forming units, as will be later pointed out, and each of these forming units includes various instrumentalities that are positively operated in accurately timed relation. This means that it is highly important that a single dough strip be delivered to each forming unit at exactly the right moment. With these conditions in mind, another highly important object of the present invention is to provide a new and highly-improved depositor which will take the dough strips from the rolling aprons and positively deliver them in accurately timed relation of the forming units.

More in detail, the invention has as an object the provision, in a pretzel twisting machine of the type indicated, a depositor which includes a timing pusher and a feed pusher. The operations of these pushers are accurately synchronized and a baffle arrangement provided so that the timing pusher can deliver one, and only one, dough strip to the feeding pusher. If a dough strip should be in position on the timing pusher for subsequent delivery to the feeding pusher, its presence will prevent the positioning of another dough strip thereon. Thus, if such a dough strip should come from the rolling aprons in improperly timed relation, it is simply rejected and passed down to a rejection belt. With the depositor of this invention, there is definite assurance that no more than a single dough strip can be delivered to any forming unit and the delivery is accurately timed. The worst that can happen is that some forming unit on one cycle of operation may fail to have a dough strip delivered thereto. However, such a condition is not serious and will not cause such jamming as would require stopping operation of the machine.

In the machines of the patents above referred to, each forming unit is a separate entity and the various instrumentalities included therein are actuated by cams arranged on opposite sides thereof. In the machine of said Patent No. 2,628,577, the forming units are mounted on the periphery of the drum, but still have their individual identity.

Another highly important object of the present invention is the provision, in a pretzel twisting machine of the character noted, of a drum into which are incorporated the forming units, the forming units becoming a part of the drum. With this arrangement it is possible, and entirely practical to locate certain of the operating cams within the interior of the drum. This arrangement makes possible the simplification of the driving connections to certain of the operating instrumentalities of the forming units.

Each forming unit includes a twisting plate that is pivotally mounted in a folding yoke. In accordance with the present invention, this yoke is pivotally mounted between the two sides of the drum. An important object of the invention is to provide a cam that is fixably positioned in the interior of the drum, together with operating connections which are affected by said cam to operate the twisting plate.

Another object of the invention is to provide a new and improved cam at one side of the drum for causing operation of the folding yoke. This cam includes a spring-biased section which insures of a complete folding operation regardless of any discrepancies in the size of the dough strips.

Each forming unit also includes a base plate that is slidably mounted between the drum sides for movement toward and away from the periphery of the drum. This base plate carries the devices for ejecting a finished pretzel. Another object of the invention is to provide a fixed cam within the interior of the drum, together with appropriate operating connections for causing reciprocation of the base plate and operation of the ejecting devices.

As above pointed out, compactness is a feature of the utmost importance. After a pretzel is twisted it is ejected substantially at the bottom of the drum. In order that the twisted pretzels be susceptible of delivery to the boards on which they are carried into the oven, it is necessary that they be raised an appreciable height above their position after ejection from the forming units on the drum. In view of this requirement and further in view of the need for compactness, another highly important object of the invention is to provide a pretzel twisting machine of the character indicated with a conveyor belt having one end located beneath the drum where it receives formed pretzels and which conveyor belt extends back through the machine so that its other end assumes an upraised position at the end of the machine remote from the drum. Thus, advantage is taken of the length of the machine to raise the formed pretzels, and these formed pretzels are taken from the machine at the same end as that in which the dough is introduced into the hopper.

Still another object of the invention lies in the provision of a new and improved arrangement for taking rejected strips and the trimmed ends of strips and delivering them to a point at one side of the machine where they may be received in an appropriate receptacle for subsequent feeding to the supply hopper.

Various other more detailed objects and advantages of the invention, such as arise in connection with carrying out the above noted ideas in a practical embodiment, will in part become apparent, and in part be hereinafter stated as the description of the invention proceeds.

The invention, therefore, comprises a pretzel twisting machine which includes a spring-biased yielding knife for cutting pieces of dough from the dough mass at the supply hopper; rolling aprons for rolling said dough strips into bowed shape; a new and improved depositor for delivering dough strips from the rolling aprons to the forming units; a new and improved drum assembly into which the forming units are incorporated as a part thereof; a novel arrangement of conveyor belt for transferring formed pretzels to an upraised position; and a new arrangement for accommodating rejected dough strips and trimmed ends of dough strips.

For a full and more complete understanding of the invention, reference may be had to the following description and accompanying drawings wherein:

Figure 12 is a detailed perspective of the conveyor belt which receives rejected strips and trimmed ends together with the parts immediately associated therewith.

Figure 13 is a view illustrating the shape which is first imparted to a dough strip as it is delivered to a forming unit.

Figure 14 is a view illustrating the second step in the formation of a pretzel.

Figure 15 is a similar view illustrating the third step.

Figure 16 is a view illustrating the final step in the formation of the pretzel.

Figure 34 is a detailed showing looking in the direction of the axis of the drum and illustrating the operating connection to the pasters and the cam for actuating the same.

Figure 35 is a detailed perspective taken from one side of the base plate of one forming unit.

Figure 36 is a detailed perspective looking at the other side of the base plate.

Figure 37 is a detailed perspective of a base plate, a portion of the cam for causing reciprocation thereof and the operating connections therebetween.

Figure 39:
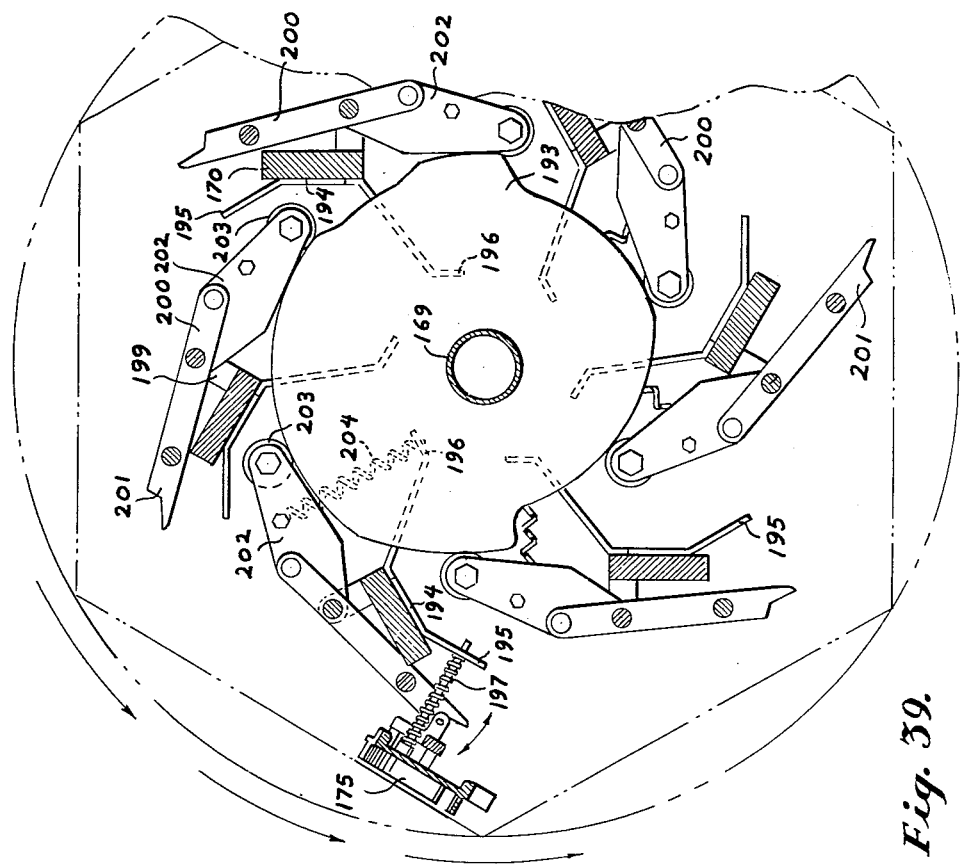
Figure 38:
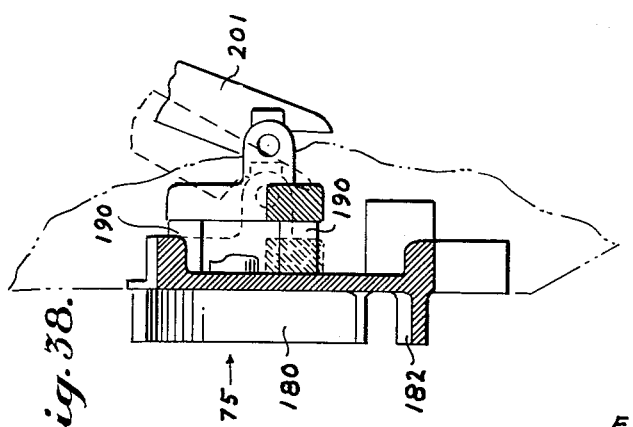

Figure 38 is a detailed showing, partly in section and partly in elevation, of the ejector devices and a portion of the connections for causing actuation thereof; and Figure 39 is a view looking in the direction of the axis of the drum and illustrating the cam which causes reciprocation of the base plates of the forming unit and operation of the ejecting devices, together with the operating connections in engagement therewith.

General assembly

The pretzel twisting machine of this invention is shown as being mounted on a base 10 from which upstand a pair of side frames. One of these is disclosed in Figure 2 and comprises the vertical uprights 11, 12, and 13 which are joined at the top by longitudinally extending top piece 14. The other side frame is shown in Figure 3 and comprises the vertical uprights 15, 16, and 17 which are joined at the top by the longitudinally extending top piece 18.

Figure 2:
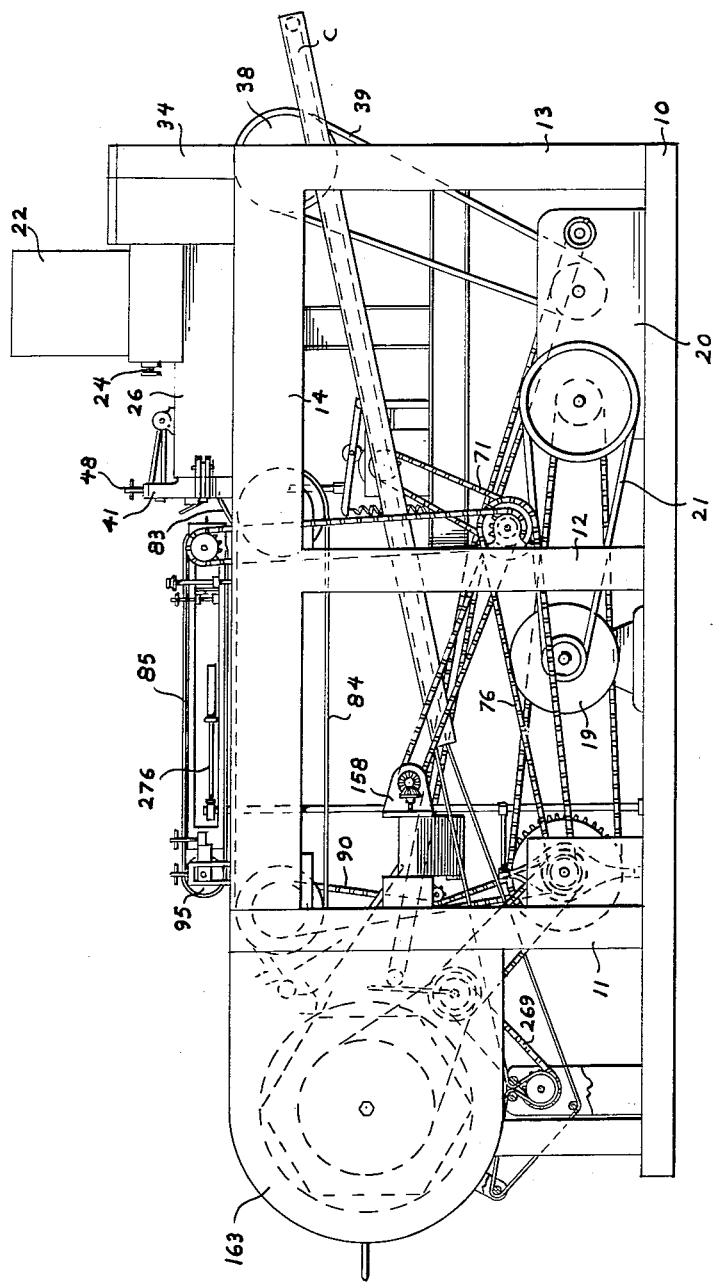
Figure 2 is a view in side elevation looking at one side of the machine.
Figure 3:
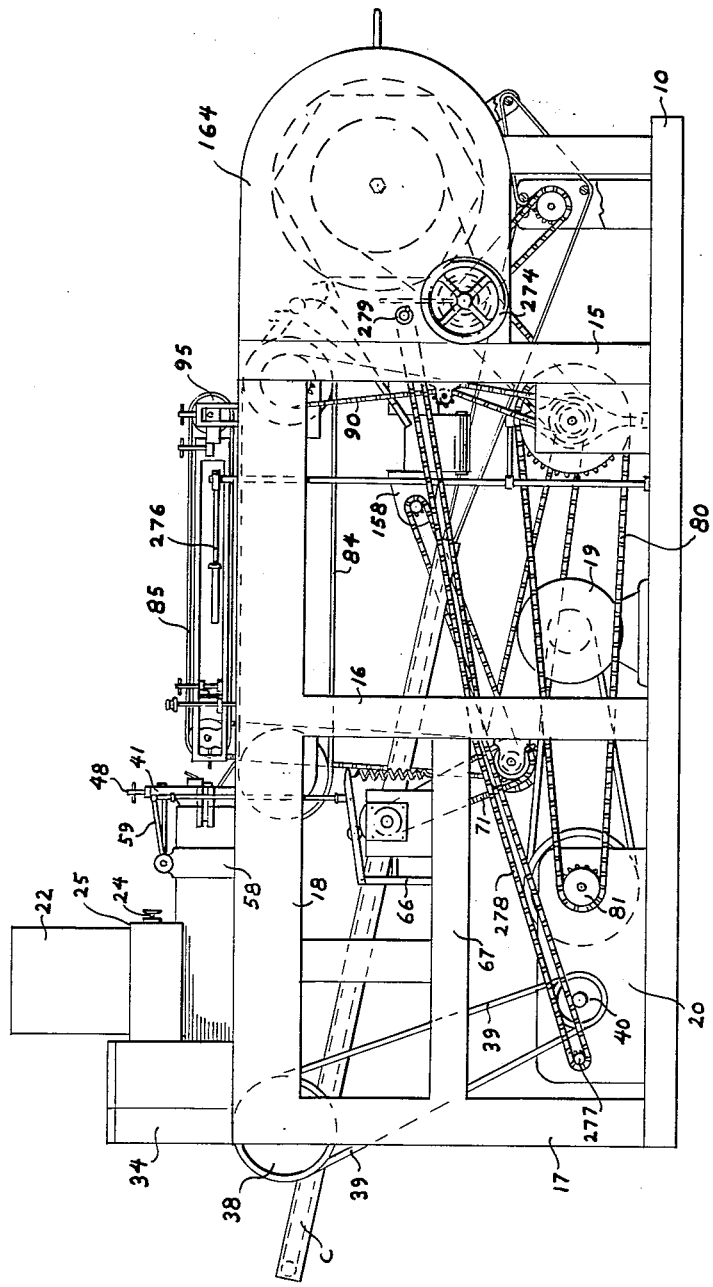
Figure 3 is a view in side elevation looking at the other side of the machine.
Figure 4:
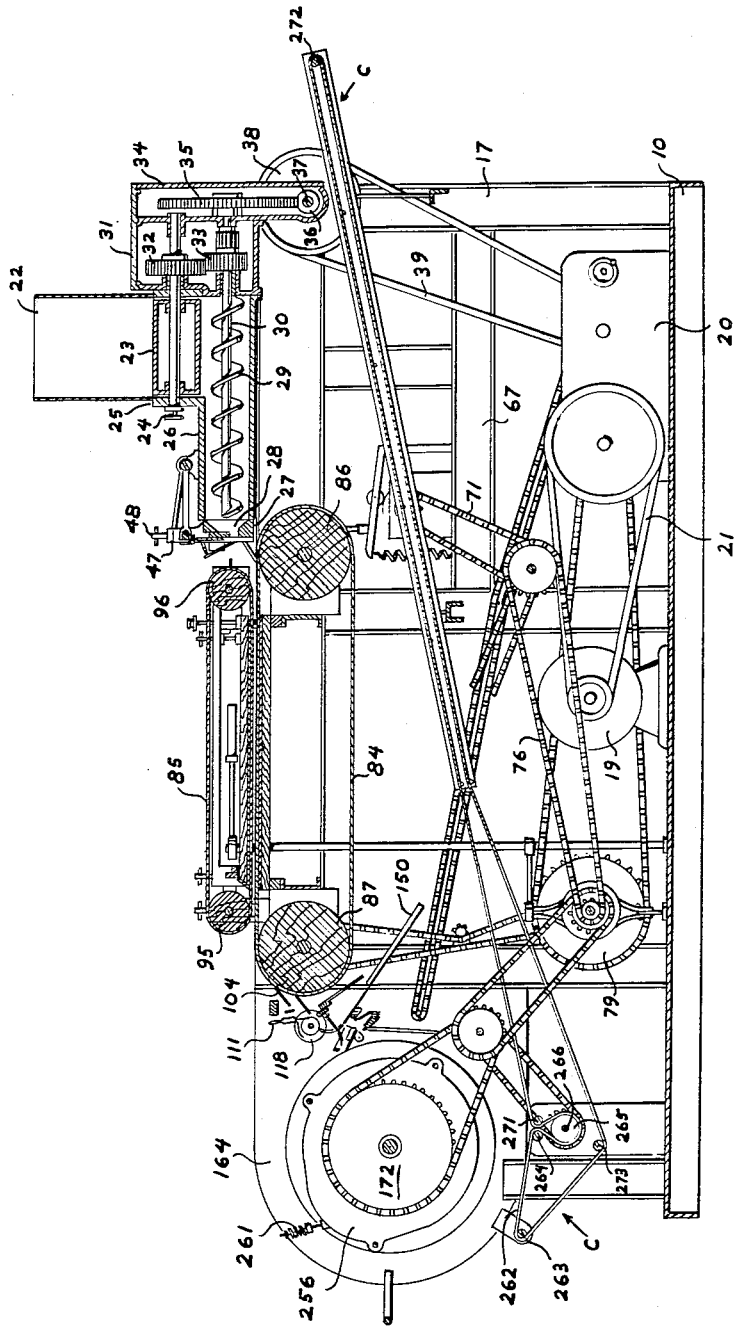
Figure 4 is a longitudinal vertical section through the machine, taken on a plane substantially midway the sides thereof.

For the purposes of this specification, the right-hand end of the machine, as illustrated in Figures 2 and 4, will be designated the front of the machine. The side frame which is shown in Figure 2 is at the lefthand side and the side frame which is shown in Figure 3 is at the righthand side. The end at which the drum is located will be called the rear end.

Mounted on the base 10 is an electric motor 19. Also mounted on the base 10, adjacent to the front end, is a gear reduction unit that is illustrated in block outline in Figures 2 to 5 inclusive and designated 20. Gear reduction units such as this are well known and available to the public as such and the particular details thereof are not a part of this invention. A gear box which is found to be suitable for the purposes of this machine is the "Reeves." This gear box is driven from the motor 19 by drive belt 21. All of the instrumentalities are driven from this gear box, in a manner to be later described, except for the trimming knives which have their own motor.

Generally speaking, the machine includes a supply hopper for receiving the dough which is to be formed into pretzels. This hopper is shown at 22 and is located at the front end of the machine. Associated with this supply hopper are feed rollers and extruding worms, together with a knife for cutting off pieces of the dough.

After the pieces of dough are cut they pass to a roller apron assembly and from the roller aprons a depositor delivers them to the drum, including the forming units. The finished pretzels are ejected from the drum and returned by a conveyer apron to the front end of the machine. Each of these components is hereinafter described in an individual chapter directed thereto.

The knife

Upon referring to Figures 1 and 4, it will be seen that the hopper 22 is of rectangular formation and mounted below the lower end thereof are a pair of complemental feed rolls 23. These feed rolls 23 are drivably carried by shafts 24 which are in parallel relation and which are journalled in wall structure 25 that upstands from a worm casing 26. At the inner end of this casing 26 there is an end closure plate 27 formed with an orifice 28. A pair of complemental worms 29 are carried by shafts 30 which are journalled in the worm casing 26 with the worms 29 being located below the feed rolls 23.

The shafts 24 project beyond the wall structure 25 at the front end and into a gear casing 31. The shafts 30 also project through the worm casing 26 and through the gear casing 31. The shafts 24 carry gears 32 which mesh and cause the feed rolls to be driven together. Likewise, the worm shafts 30 carry gears 33 which mesh and cause the worms to be driven together. Moreover, one of the geras 32 meshes with one of the gears 33 so that the feed roll shafts 24 are driven from one of the worm shafts 30.

One of the worm shafts 30 is projected beyond the gear casing 31 and into a worm gear casing 34 where it drivably carries a worm gear 35. Meshing with with the worm gear 35 is a worm 36 that is drivably carried by a shaft 37.

Figure 1:
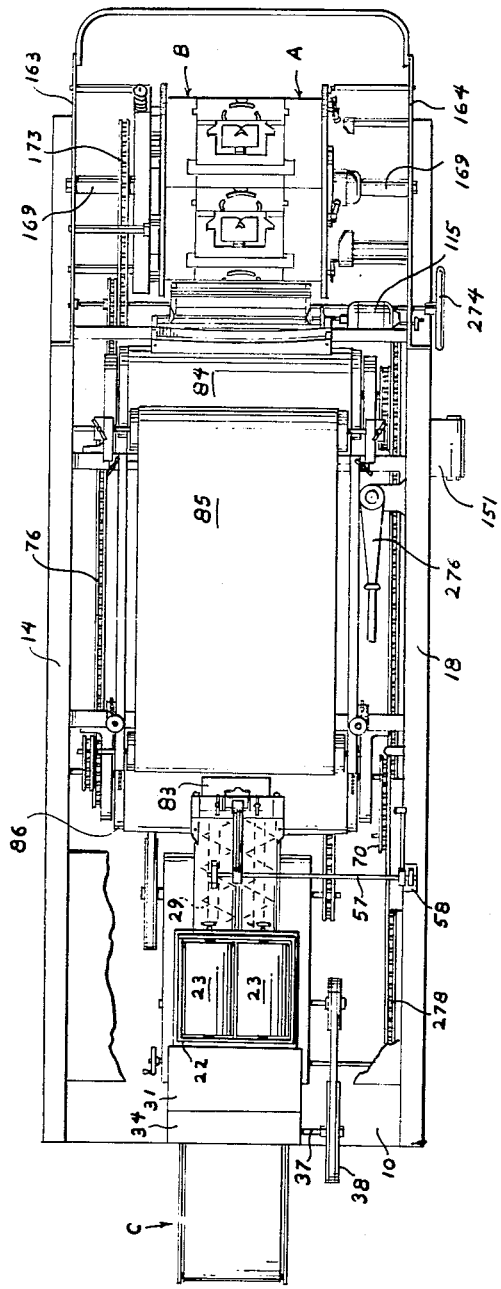
Figure 1 is a top-plan view of a pretzel twisting machine designed in accordance with the precepts of this invention.

As shown in Figure 1, the shaft 37 extends out beyond the worm gear casing 34 at the righthand side and drivably carries a pulley 38. A drive belt 39 passes over this pulley 40 which is included as a part of the gear box 20. Thus, the feed rolls 23 and worms 29 are driven from the gear box and serve to take the dough from the hopper 22 and force it out of the orifice 28 under pressure.

Figures 6, 7:
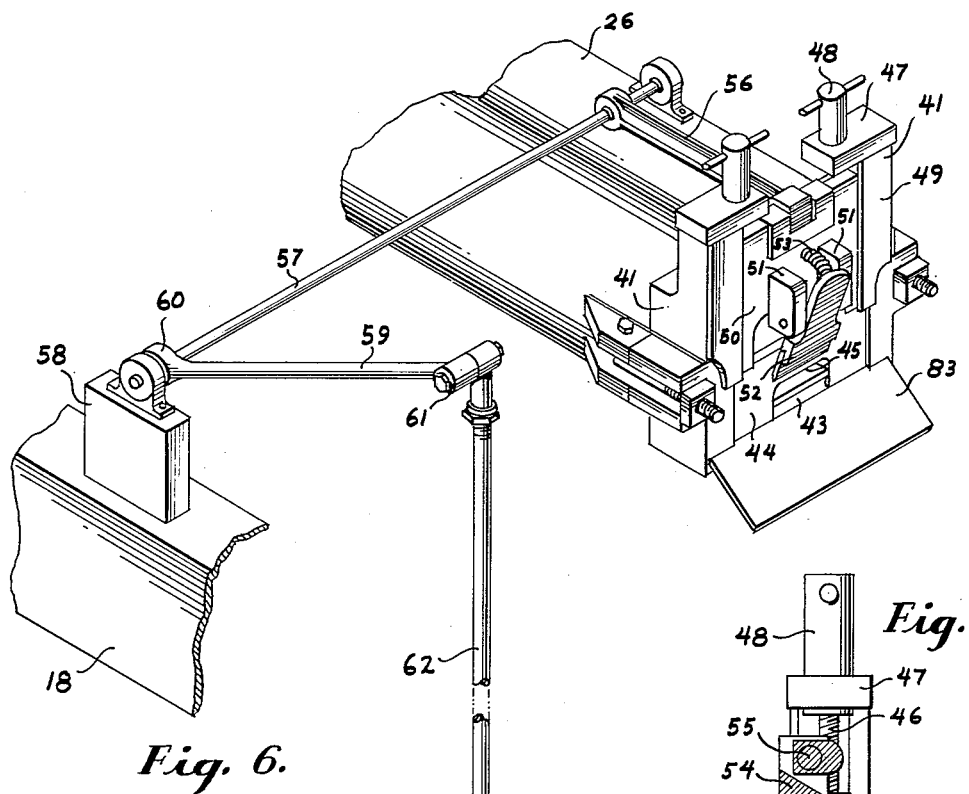
Figure 6 is a detailed perspective, taken on an enlarged scale, illustrating the knife and associated instrumentalities.
Figure 7 is another detailed view taken on an enlarged scale, and is a section through the knife and the parts immediately associated therewith.

Referring now more particularly to Figures 6 and 7, the knife assembly which is mounted on the inner end of the worm gear casing will be described. Secured to opposite sides of the worm gear casing 26, by bolts, are a pair of side pieces 41. Extending between these side pieces at the bottom is a plate 42 which carries a center block 43, the upper edge of which is in alignment with the bottom edge of the orifice 28. A U-shaped plate 44 has legs which extend on opposite sides of the center block 43 and has an edge at 45 that is spaced above the edge of the center block 43. The plate 44 may be adjusted relative to the center block 43 to vary the distance between the edge 45 and the center block and thus vary the area of the orifice through which the dough is extruded. This adjustment is obtained by screw stems 46 which are secured to the U-shaped plate 34 and which extend upwardly through top brackets 47 carried by the side pieces 41. Sleeves 48 are fitted over the upper ends of the stems 46 and are provided with operating handles to facilitate their rotation. It is evident that by rotating the sleeves 48, the U-shaped plate 44 may be raised or lowered to vary the effective area of the orifice defined by this plate 44 and the center block 43.

Also carried by the side pieces 41 are guide strips 49 which define channels which receive the edges of a reciprocating plate 50. The plate 50 carries a pair of ears 51 and between which ears is pivotally mounted a knife 52. The lower portion of this knife at which the knife edge is formed is sufficiently wide in extent to span the distance between the legs of the U-shaped plate 44. The upper portion of the knife is located between the ears 51 and an expansion coil spring 53 normally biases the upper portion outwardly. Due to the pivotal mounting, this forces the knife edge inwardly against the plate 44 with a yielding pressure.

The upper edge of the reciprocating plate 50 is formed with a recess which receives a connecting block 54. The connecting block 54 is also formed with a central recess across which extends a pin 55.

An arm 56 is formed at one end with a slot which receives this pin 55. The arm 56 is drivably carried by shaft 57 which has one end journalled on the worm casing 26 and the other end on a support 58 that upstands from the top piece 18 of the side frame. It is evident that as the shaft 57 is oscillated the arm 56 is moved upwardly and downwardly to reciprocate the plate 50 which carries the knife 52.

Another arm 59 has one end drivably secured to the shaft 57, as indicated at 60, and its free end is pivotally connected, as indicated at 61, to a link 62. Secured to the lower end of the link 62, as at 63, is a lever defined by spaced side straps 64. Pivotally mounted between the straps 64 and intermediate the ends thereof is a cam follower 65. At the end remote from the connection 63 the straps 64 are pivotally mounted on a supporting bracket 66. The latter upstands from a horizontal support 67 which extends between the vertical uprights 16 and 17 of the side frame.

A cam 68 is carried by stub shaft 69 which also carries a sprocket 70. (See Figures 1 and 5.) This sprocket 70 is driven by a chain 71 (see Figures 2, 3, and 5) in a manner about to be described.

A tension coil spring 72 has one end anchored to the free end of the lever 64 and its other end to the horizontal frame 67. This spring maintains the cam follower 65 against the cam 68. It is evident that as the shaft 69 is rotated the cam 68 is also rotated to raise or lower the cam follower 65, depending upon the configuration of the cam and thus reciprocate the link 62 with the motion being ultimately transmitted to the knife 52.

Figure 5:
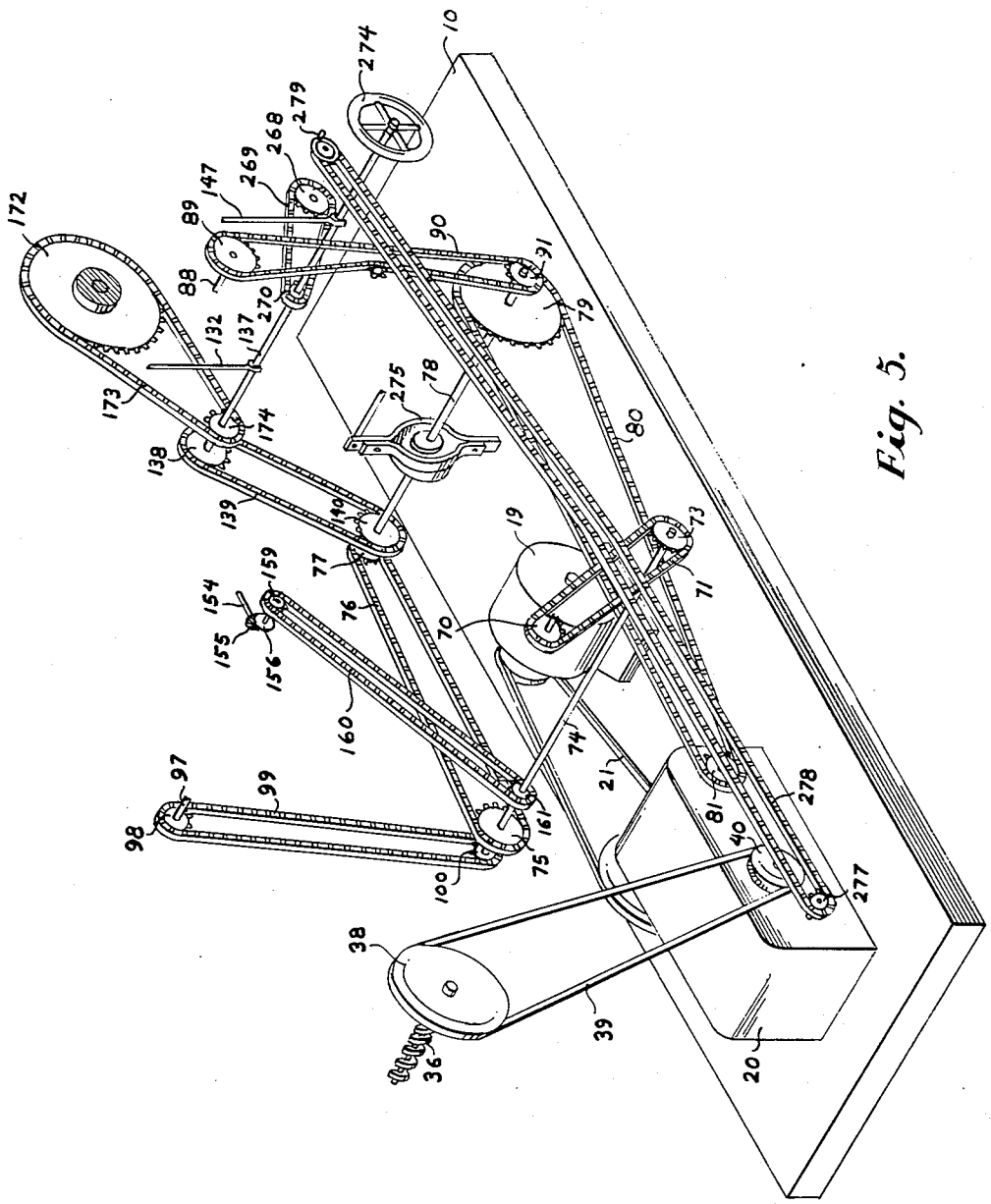
Figure 5 is a perspective illustrating the drives to the various components of the machine.

Referring now more particularly to Figure 5, it will be seen that the chain 71 passes over a sprocket 73 that is drivably carried by a shaft 74 which is journalled in the frame of the machine. This shaft 74 also carries a sprocket 75 over which passes another chain 76. The chain 76 also passes over a sprocket 77 carried by shaft 78. The shaft 78 drivably carries another sprocket 79 over which passes a chain 80. The chain 80 passes over still another sprocket 81 which is included as a part of the gear box 20.

It is evident that the sprocket 81 drives the chain 80 to rotates the sprocket 79 and thus drive the shaft 78 to rotate the sprocket 77. The latter movement drives the chain 76 to rotate the sprocket 75 and rotate the shaft 74 and thus drive the sprocket 73 and actuate the chain 71 to drive the sprocket 70.

Referring now again more particularly to Figures 6 and 7, it will be noted that the center block 43 is formed with a longitudinally extending depression 82 on its exposed face immediately beneath its upper edge. This depression aids in assuring that each piece of dough is cleanly cut from the mass which is extruded through the orifice. The cut piece of dough falls onto an inclined apron 83 from which it passes down to the roller apron assembly.

Briefly referring to the novel features of the operation of the knife above described, it is noted that the dough in the worm casing is under constant pressure. This means that it exhibits a tendency to constantly move through the orifice defined by the center block 42 and U-shaped plate 44. However, such movement is readily accommodated by the yielding bias of the knife. The spring 53 will give and permit the knife to yield a slight amount as it makes each cut and on the return stroke the knife passes through the same opening formed by cutting off a piece of dough without wiping the dough back through the space 45.

Furthermore, should any hard, foreign objects be present in the dough, the knife, upon striking thereagainst, will yield rather than be damaged.

*Rolling aprons*

The roller apron assembly comprises a lower apron 84 and an upper apron 85, both of which take the form of wide, endless belts of an appropriate fabric. It will be further noted from the several figures of the drawing that the lower apron is wider and longer than the upper apron and there is a greater distance between the plies thereof.

Figure 8:
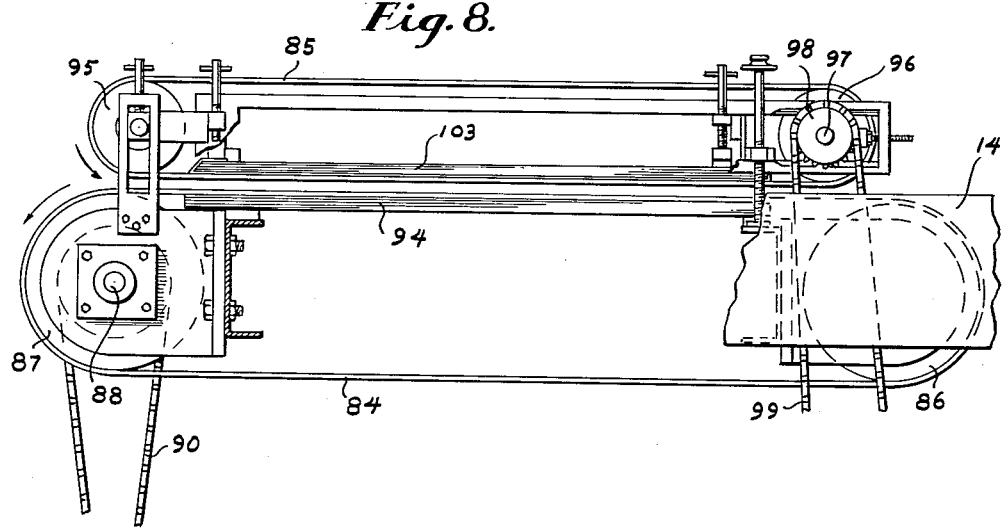
Figure 8 is a side view illustrating the roller apron assembly.
Figure 9:
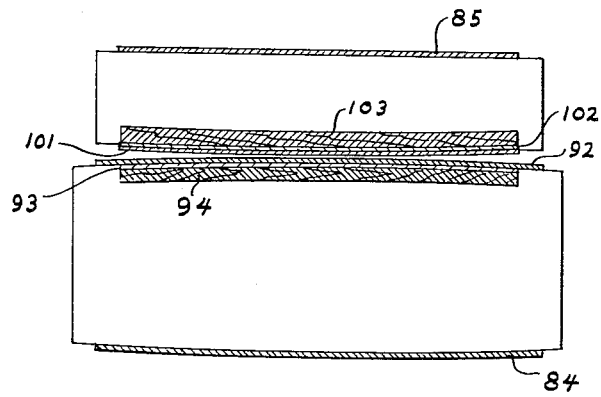
Figure 9 is a transverse vertical section through the roller apron assembly.

Referring now more particularly to Figures 8 and 9, the lower apron 84 passes over an idler roller 86 which is mounted on a shaft that is appropriately journalled in the frame of the machine. It also passes over a drive roller 87 that is carried by a shaft 88 and which shaft carries a sprocket 80 over which passes a chain 90. Chain 90 also passes over sprocket 91 that is drivably carried by the shaft 74. As was explained in describing the driving connections for the knife, the shaft 74 is driven from the gear box 20. Thus, the driving roller 87 is also driven from the gear box through the medium of shaft 88, sprocket 89, chain 90, and sprocket 91.

The top ply of the bottom apron 84 is represented at 92 in Figure 9. This top ply passes over a thin stainless steel plate 93 which is bowed upwardly from side to side throughout its length so as to impart a corresponding shape to the top ply 92. This stainless steel plate 93 is supported by a wooden table 94 which is in turn supported by the structure that is carried by the frame of the machine.

The top apron 85 passes over an idler roller 95 and also over a driving roller 96. The latter is mounted on a shaft 97 which carries a sprocket 98. A chain 99 passes over the sprocket 98 and also over sprocket 100, this is drivably carried by the shaft 74. As above explained, shaft 74 is driven from the gear box 20. Thus, the top apron 85 is driven from the gear box through the medium of the connections to the shaft 74 and the sprocket 100, chain 99, sprocket 98, shaft 97, and driving roller 96.

Referring now more particularly to Figure 9, the bottom ply of the top apron 85 is designated 101. This bottom ply passes over a stainless steel plate 102 which is bowed throughout its length and which imparts a corresponding curvature to the bottom ply 101. The plate 102 is carried by a wooden support 103 which is susceptible of adjustment to vary the curvature of the plate carried thereby. This bottom ply 101 of the top apron 85 is driven in a direction exactly opposite to that of the top ply 92 of the bottom apron and at a speed of about 60% of that of the bottom apron.

At this point it is well to note that both the upper and lower aprons are provided with mechanisms for varying the tension thereof and also for adjusting the relative distance therebetween. Such mechanism is fully illustrated and described in the co-pending application of Gipe, above referred to.

Due to the fact that the dough is delivered to the roller aprons in the form of a piece having a shape corresponding to that of the orifice through which it passes, the curvature of the top and lower plies of the lower and bottom aprons, respectively, is important. This shape not only results in a rolling out of the dough pieces into elongated strips, but also imparts to the strips themselves a curvature. This arcuate formation of the dough strips is important because with this shape it is possible and entirely practical to maintain the dough strips in proper relation to one another.

*The depositor*

After a piece of dough has been rolled into an elongated strip by the action of the aprons 84 and 85, it passes from between these aprons and is positioned on the top ply 92 of the lower apron 84. Upon referring to Figures 10 and 11 it will be noted that from the top ply the dough strip having the arcuate shape passes onto an inclined top ramp 104. The lower edge of this ramp 104 is spaced from a curved baffle 105. The curvature being substantially that of the dough strip.

The dough strip has a momentum which is imparted thereto by the aprons so that when it strikes against the baffle 105 it is straightened. It then falls down through the space 106 between the edge of the ramp 104 and baffle 105 and falls onto a bottom ramp 107.

Spaced from the lower edge of the bottom ramp 107 is an adjustable baffle 108 which is pivotally mounted, as indicated at 109, in brackets 110 at the opposite ends thereof which are carried by the frame of the machine. This adjustable baffle 108 is provided with a handle 111 which may be availed of in adjusting the position of the baffle relative to the bottom ramp 107.

After passing down the ramp 107, the dough strip strikes the baffle 108 and falls through the space between the two onto a narrow ledge 112 which is just sufficiently wide to accommodate a single dough strip. The ledge 112 is defined by the upper edge of a wooden crosspiece 113 which assumes the angular position illustrated in Figures 10 and 11 and which is carried by the frame of the machine. Secured to the upper face of this crosspiece 113 is an inclined stainless steel plate 114 which functions as a reject ramp. Should the ledge 112 be occupied by a dough strip at the time when another dough strip falls down through the space between the ramp 107 and the baffle 108, it will be diverted onto the reject ramp 114 and passed onto the reject conveyor in a manner to be later described.

Figure 10:
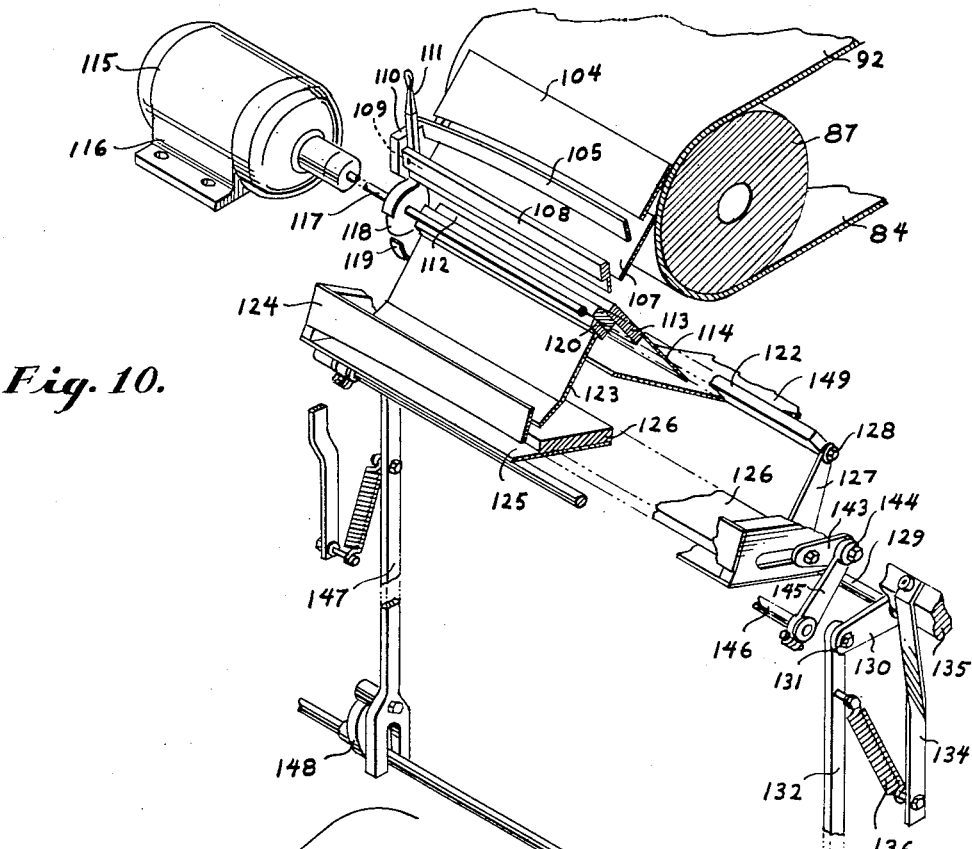
Figure 10 is a detailed perspective of the depositor with certain parts broken away and shown in section.

An electric motor is represented at 115 in Figure 10. This motor is mounted on the framework of the machine at the right-hand side by bracket 116 and has a drive shaft to which is drivably connected a shaft 117 which carries a pair of cutting discs 118. These cutting discs are arranged at the opposite ends of the ledge 112 and serve to trim the ends of a dough strip resting thereon to effect the proper length required for the subsequent twisting operations. These discs 118 rotate at a relatively high speed, in the nature of 1,500 R. P. M., to insure of a clean cut. Beneath each disc 118 there is a curved apron 119 for catching the trimmed ends and passing them onto the reject conveyor.

Figure 11:
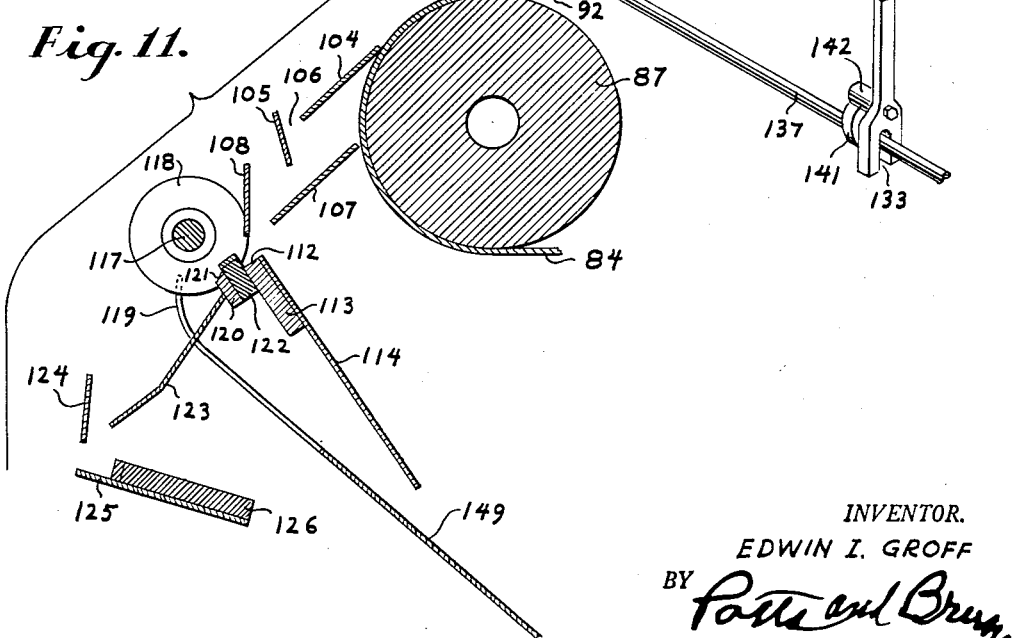
Figure 11 is a view, largely diagrammatic, taken as a vertical section through the depositor with parts omitted.
Figure 17:
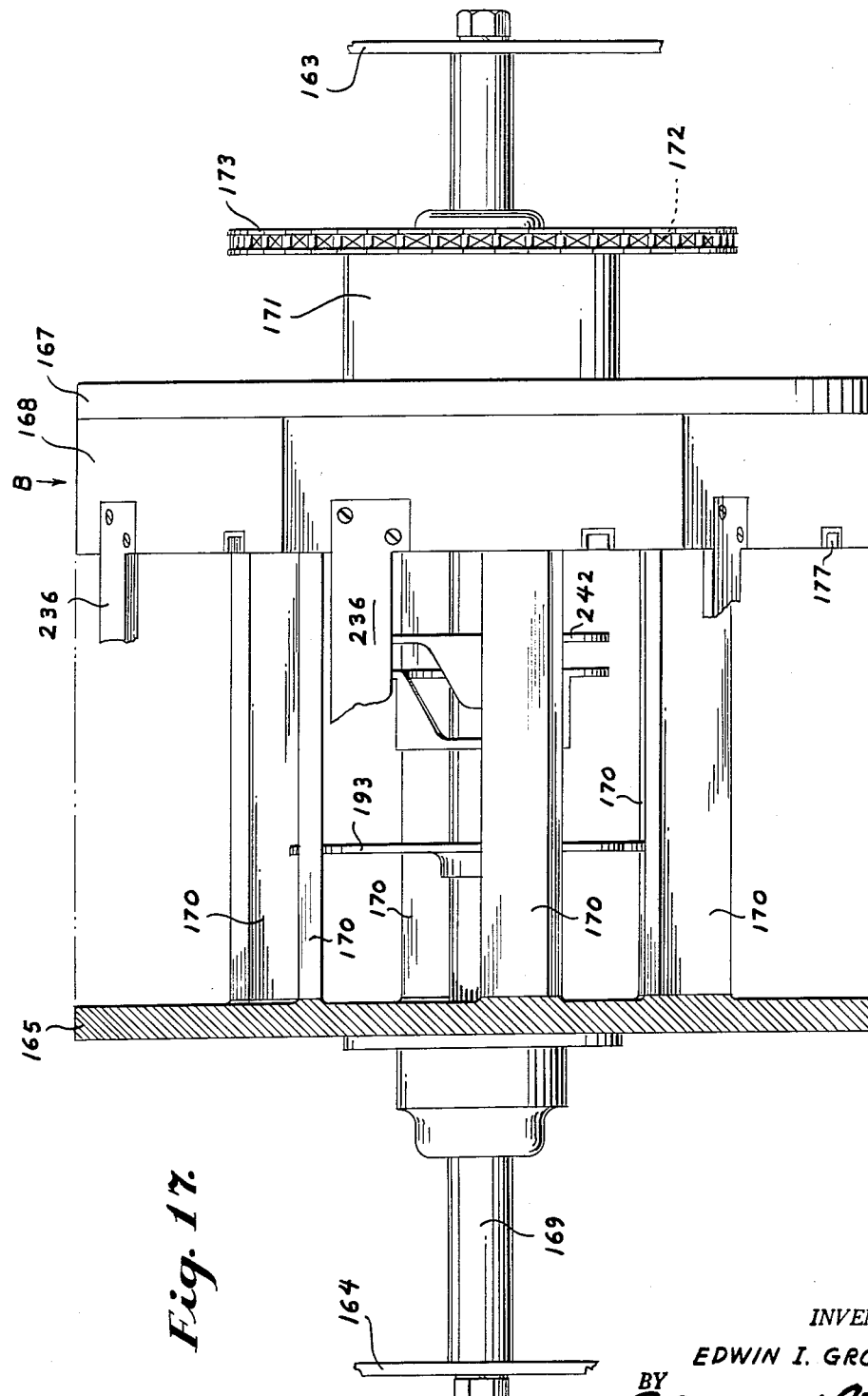
Figure 17 is a view illustrating the drum construction with the forming units removed.

Spaced from the lower crosspiece 113 is a second crossprice 120 having a beveled upper edge 121. Between the crosspieces 113 and 120 there is slidably positioned a timing pusher 122. This pusher operates with a reciprocating motion. Figure 11 shows the position of the pusher just after it has pushed a dough strip up over the edge 121 of the crosspiece 120. It is evident that when in this position a dough strip may come from the ramp 107 and upon falling on the ledge 112 be maintained thereon by engagement with the side face of the pusher 122.

However, upon retraction of the pusher 122 into a lowermost position, this dough strip will fall off the ledge 112 and be engaged by the edge of the pusher 122.

After a dough strip passes over the beveled edge 121 of the crosspiece 120 it falls onto a transfer ramp 123. The latter is of the compound angular construction illustrated and the lower edge thereof is spaced from a feed baffle 124. Below the ramp 123 and baffle 124 there is a feed table 125 that is carried by the supporting framework of the machine, and slidably mounted for reciprocation on the upper surface of the said table 125 is a feed pusher 126. The operation of the feed pusher 126 is so synchronized with respect to the operation of the timing pusher 122 by the connections about to be described, that when a dough strip falls down through the space between the lower edge of the ramp 123 and the baffle 124 the feed pusher 126 is in a retracted position. Thus, the dough strip falls in front of the edge of the pusher 126. After assuming this position, the pusher 126 moves upwardly to push the dough strip off the feed table 125 and onto a forming unit which will be in exactly the right position for receiving this dough strip.

From the above paragraph it is apparent that the operation of the feed pusher 126 must be accurately timed in relation to rotation of the drum which carries the forming units and the operation of the feed pusher 122 must be accurately timed with respect to that of the feed pusher 126.

A pair of arms 127, one of which is illustrated in Figure 10, have one end pivotally connected to the timing pusher 122 as indicated at 128. These arms 127 are drivably carried by shaft 129 which is journalled in supports carried by the frame of the machine. Extending outwardly from this shaft 129 and drivably connected thereto is another arm 130. Pivotally connected to the free end of the arm 130, as indicated at 131, is a bar 132, the lower end of which is enlarged and formed with a slot 133.

A strap 134 depends from a supporting member 135 which is carried by the frame of the machine and a tension-coiled spring 136 has one end secured to the strap 134 and the other end of the bar 132. This spring normally exerts a tendency urging the bar 132 downwardly.

A shaft 137 extends transversely of the machine and carries at its left-hand end a sprocket 138 (Figure 5) over which passes a chain 139. This chain 139 also passes over a sprocket 140 carried by the shaft 78. As the shaft 78 is driven from the gear box 20, the shaft 137 is also driven therefrom.

Drivably mounted on the shaft 137 is a cam 141 which is engaged by a cam follower in the form of a roller 142 that is carried by the arm 142. It will be noted that the slot 133 receives the shaft 137 with the latter functioning as a guide for positioning the lower end of the bar 132. The action of the spring 136 maintains the cam follower 142 in engagement with the cam 141.

It is evident that the rotation of the shaft 137 will cause reciprocation of the bar 132, which motion is transmitted through arm 130, shaft 129, and arms 127 to the timing pusher 122 to cause reciprocation of the latter. The shape of the cam 131 accurately insures that forward and backward movement of the timing pusher will take place at exactly the right time.

Pivotally connected to the opposite ends of the feed pusher 126 are a pair of links 143, one of which is illustrated in Figure 10. Pivotally connected to the other end of each link 143, as indicated at 144, is an arm 145 with each arm 145 being drivably carried by a shaft 146 which extends across the machine beneath the feed table 125. This shaft 146 drivably carries an arm that is comparable to the arm 130 (not illustrated) and to the free end of which arm is connected a bar 147. This bar 147 is reciprocated by a cam 148 that is drivably mounted on the shaft 137.

The arrangement of the cam follower and the spring for keeping the cam follower in engagement with the cam 148 is exactly the same as that described above in connection with the bar 132 and the cam 141. It is evident that the rotation of the shaft 137 reciprocates the arm 147 to oscillate the shaft 146 and thus reciprocate the feed pusher 126. Due to the fact that both the cams 141 and 148 are carried by the shaft 137, the operations of the timing pusher and feeding pusher are accurately synchronized.

Reject conveyor

Referring now more particularly to Figure 12, it will be noted that the curved aprons 119 which are positioned beneath the trimming knives are formed as integral parts of a return ramp 149. Moreover, the reject ramp 114 has its lower edge positioned over the return ramp 149 so that a rejected dough strip will pass from the reject ramp onto the return ramp.

The return ramp 149 is provided with side flanges 150 which converge at the bottom and which retain the pieces of dough on the ramp. The lower edge of this return ramp 149 is positioned over the top ply 151 of a return conveyor 152 which extends transversely across the machine which is forwardly of and beneath the depositor. The return conveyor 152 passes over two rollers in the usual manner with one of the rollers being constituted the driving roller. This driving roller is shown at 153.

The driving roller 153 is carried by shaft 154, the free end of which carries a beveled gear 155. Meshing with the gear 155 is a complemental gear 156 that is drivably carried by a stub shaft 157. Both the shafts 154 and 157 are journalled in the two parts of an angle bracket 158 that is supported from the frame of the machine and the end of the stub shaft 157 remote from the beveled gear 156 drivably carries a sprocket 159. Passing over the sprocket 159 is a chain 160. Upon referring to Figure 5, it will be seen that this chain 160 also passes over a sprocket 161 drivably carried by the shaft 74. As the shaft 74 is driven from the gear box 20, the conveyor belt 152 is driven so that the top ply 151 will take dough from the return ramp 149 and transfer it to the right-hand side of the machine where it may be received by a suitable receptacle for subsequent feeding to the hopper 22.

The drum

Before referring to the actual construction of the drum and the mechanism carried thereby, attention is directed to Figures 13 to 16 inclusive. These figures illustrate the basic steps in the twisting of a pretzel.

When a dough strip such as that designated 162 is first delivered to a forming unit on the drum, it falls into the inverted U-shape illustrated in Figure 13. In the next step the lower portion of the sides of the U are indented, as depicted in Figure 14. The indented sides are then twisted together through a full 360°, as represented in Figure 15. The twisted portion is then folded, as illustrated in Figure 16, with the free ends of the strip overlying the bend of the U. Pasters are now operated to stamp or impress these ends into the bend of the U.

Upon referring to Figures 1 to 4 inclusive, it will be seen that the base 10 extends beyond the uprights 11 and 15. As shown in Figure 2 a drum-supporting side plate 163 extends rearwardly from the upright 11 and, as illustrated in Figure 3, a second drum-supporting side plate 164 extends rearwardly from the upright 15. These side plates 163 and 164 are disposed on opposite sides of the machine and the drum is mounted therebetween.

The drum itself comprises two side pieces A and B. The side piece A consists of a circular head 165 from which extend inwardly six flat plates 166. The head 165 and plates 166 are preferably formed as an integral unit and the plates 166 are all of the same size and shape and are equiangularly spaced about the center of the head 165.

Likewise, the side piece B comprises a circular head 167 and six flat plates 168 which extend inwardly therefrom.

A shaft 169 extends across the distance between the drum-supporting side plates 163 and 164 and has its end securedly anchored thereto. The heads 166 and 167 are journalled for free rotation on this shaft by appropriate bearings.

Extending between the side pieces A and B of the drum, are six cross-supports 170. There is one of these cross-supports for each pair of flat plates 166 and 168, and the cross-supports 170 have their ends anchored to the heads 165 and 167.

The drum side pieces A and B, including the heads 165 and 167, and the flats 166 and 168, together with these crosspieces 170, constitute the skeleton of the drum.

Extending outwardly from the outer side of the head 167 is a sleeve 171 which carries a sprocket 172. Passing over the sprocket 172 is a chain 173 and this chain 173 also passes over a sprocket 174 (Figure 5) drivably carried by the shaft 137. As above explained, this shaft 137 is driven from the gear box 20. Thus, the drum is also driven from this gear box through the medium of sprocket 174, chain 173, sprocket 172 and sleeve 171.

As shown in the drawings, the plates or flats 166 and 168 are in accurate alignment; that is, the face of each pair of flats lies in the same plane. Each of these flats carries the devices which make up a forming unit.

Each forming unit comprises a base plate 175 that is slidably mounted for reciprocation toward and away from the axis of the drum by ears 176 which are received in channels 177 formed in the inner edges of the flat plates 166 and 168. These channels are preferably lined with bronze channel members. Each forming unit also includes a folding yoke 178 which is pivotally mounted between the flats 166 and 168 closely adjacent to the base plate 175, and a twister plate 179 that is pivotally mounted in the folding yoke 178.

Figure 20:
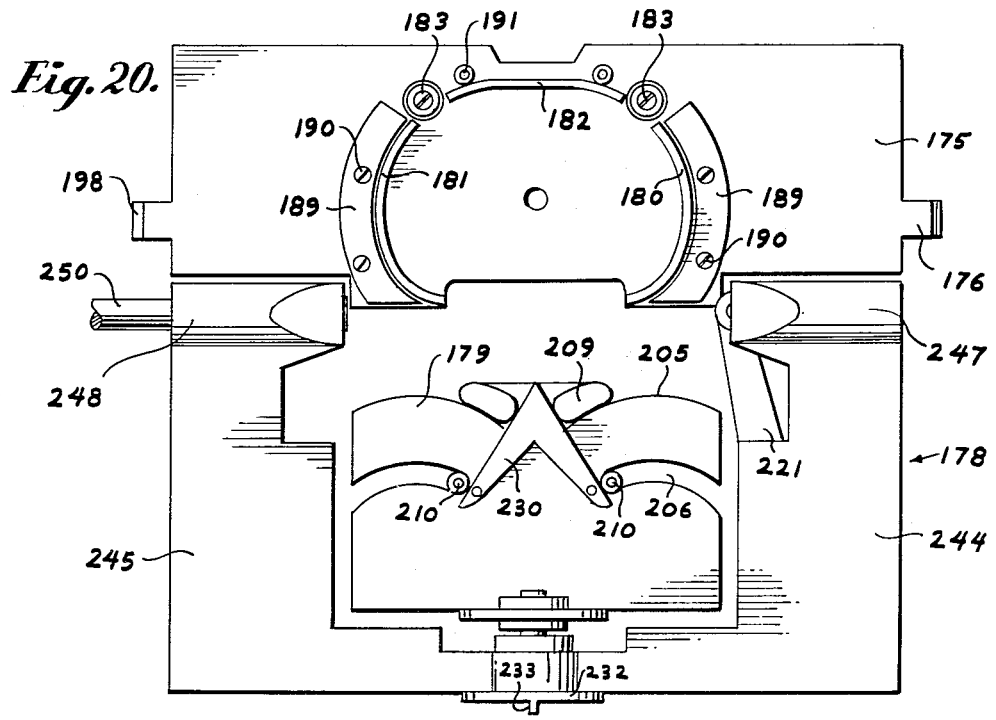
Figure 20 is a view in front elevation looking at one face of one forming unit.
Figure 21:
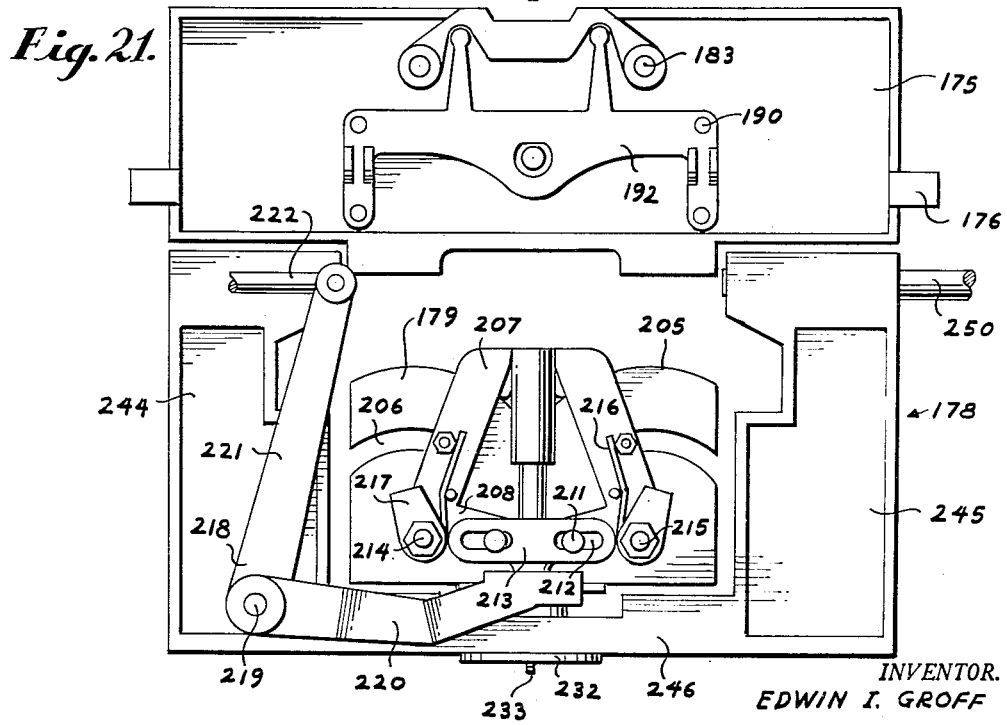
Figure 21 is a view in elevation looking at the other face of the forming unit shown in Figure 20.

Referring now more particularly to Figures 35 and 36, which may be considered along with Figures 20 and 21, the base plate 175 is shown as carrying on its outer face three arcuate segments 180, 181, and 182. The segments 180 and 181 are at the sides and segment 182 in the middle. When the base plate is in position to receive a dough strip from the depositor, this middle segment 182 is at the top and receives the middle portion of the dough strip which defines the bend of the inverted U, as illustrated in Figure 13.

Figure 22:
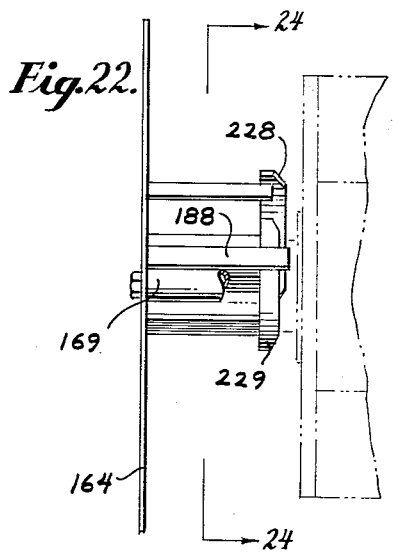
Figure 22 is an elevational view showing the cams at one side of the drum with the drum being shown in phantom outline.
Figure 24:
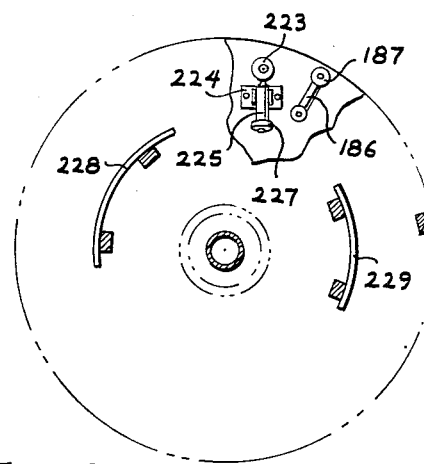
Figure 24 is a view taken normal to the axis of the drum looking from the side at which the cams of Figures 22 and 23 are located.
Figure 25:
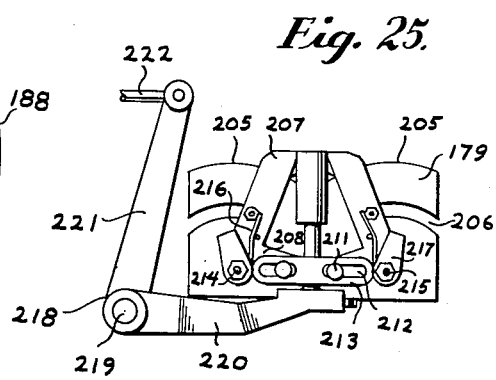
Figure 25 is a detailed elevational view illustrating the twister plate, indenting fingers mounted thereon, and part of the operating connections therefor.
Figure 26:
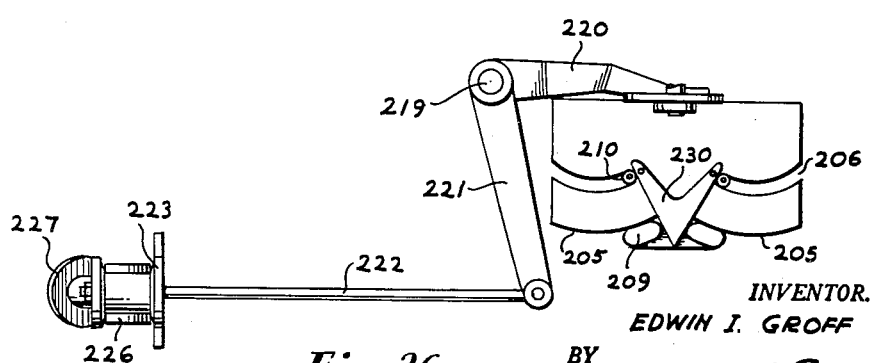
Figure 26 is a view looking at the other side of the twister plate and showing the remainder of the operating connections for the indenting fingers.
Figure 27:
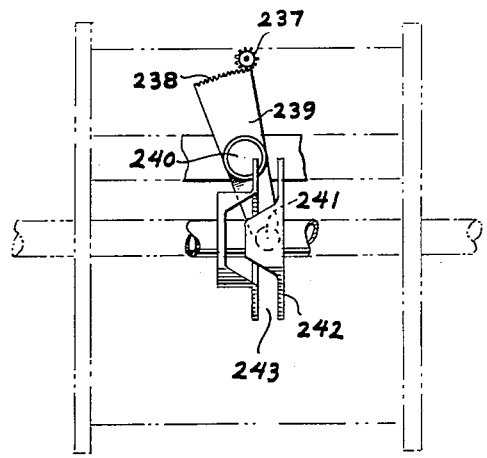
Figure 27 is a view in elevation of the cam for operating the twister plate together with the operating instrumentalities associated therewith and showing the drum in broken outline.

The ends of the middle segment 182 are spaced from the adjacent ends of the side segments 180 and 181 and disposed in these spaces are a pair of paster pins 183 which are slidably mounted in the base plate 175 and which extend through to the opposite sides thereof, projecting therebeyond. The inner ends of these paster pins are adapted to be engaged by fingers 184 carried by a shaft 185. This shaft 185 is located within and beneath the flats 166 and 168 and one end of the shaft 185 drivably carries an arm 186 on the free end of which is a roller 187. When this roller 187 engages a cam 188 (Figures 22, 24 and 34) as the drum rotates, the shaft 185 is rocked to cause the fingers 184 to actuate the pasters. The exact point in the cycle of operation when this takes place will be later described.

Also mounted on the front, or exposed face, of the base plate 175 are a pair of curved ejector strips 189. These ejector strips 189 closely conform in shape to the segments 180 and 181. They are carried by pins 190 which extend through holes in the base plate. A pair of ejector pins 191 are slidably mounted in the base plate 175, closely adjacent to the ends of the middle segment 182. On the inner face of the base plate 175, the pins 190 and 191 are all joined in unison by skeleton-like plate 192.

The mechanism for reciprocating the base plate 175, with respect to the channels 177, is tied up with that which operates the ejector strips and pins.

Upon referring to Figure 39, it will be seen that a cam 193 is fixedly mounted within the interior of the drum on the shaft 169. Carried by each cross-support 170 is a bracket 194 presenting feet 195 and 196. An expansion coil spring 197 is carried by a rod slidably mounted in each foot 195 and which engages one of the base plates 175 to urge the latter outwardly. This outward movement is limited by abutments 198 formed on the ears 176.

Also carried by each cross-support 170 is a second bracket 199 which pivotally carries a cam lever 200. The end of the cam lever 200, which is indicated at 201, is connected to each base plate 175 and is also adapted to engage the skeleton plate 192 to actuate the ejector strips 189 and the ejector pins 191. The other end of the lever 200 carries a piece 202, the free end of which carries a cam follower 203 in the form of a roller.

Between each piece 202 and the foot 196 of the corresponding bracket, there is a tension spring 204. This tension spring serves to maintain the cam follower 203 against the surface of the cam 193. It is evident that when this roller 203 encounters high spots in the cam the lever piece 202 is pushed outwardly, thus drawing inwardly the end 201. As this end is connected to the base plate the base plate is thus drawn inwardly. Moreover, when the follower 203 encounters an excessively low spot in the cam surface the spring 204 will draw the lever piece 202 inwardly so as to move the end 201 outwardly and actuate the ejector devices. Just when these operations take place in a complete cycle will be later described.

Each twister plate 179 has a pair of symmetrically arranged curved surfaces 205 arranged adjacent to the base plate 175. Each of these twister plates 179 is also formed with a pair of correspondingly curved slots 206. Each of a pair of bell cranks has arms 207 and 208. Each of the arms 207 carries an indenting finger 209 which rides over the surface 205 and a pin 210 which travels in a slot 206. Each of the arms 208 carries a pin 211 that is received in a slot 212 formed in each end of an actuating crossbar 213.

The bell cranks made up of the arms 207 and 208 are pivotally mounted on the twister plate 179 on pivot points represented at 214 and 215 respectively. Associated with each of these pivotal mountings is a spring 216 which tends to move the arms 207 inwardly. Means for adjusting the tension of these springs are indicated at 217, the spring 216 being attached to the member 217 so that pivotal movement of said member regulates the tension in said spring. A main operating bell crank 218 is pivotally mounted, as indicated at 219, on one side of the folding yoke 178. This bell crank 218 has an arm 220 which is connected to the actuating crossbar 213. Bell crank 218 includes a second arm 221, the outer free end of which is pivotally connected with a rod 222. The rod 222 extends outwardly through the side piece A and the head 165 thereof and beyond this head carries a spool 223.

Figure 23:
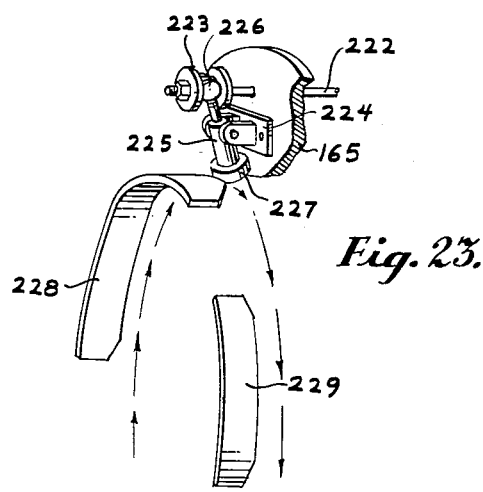
Figure 23 is a detailed perspective showing the cams which operate the indenting fingers and the operating instrumentalities engaging therewith.

Upon referring to Figure 23, it will be seen that a bracket 224 is carried by the outer face of the head 165 and a lever 225 is pivotally mounted in this bracket 224. One end of the lever 225 is bifurcated, as indicated at 226, and received therein is the spool 223. The other end of the lever carries a cam follower 227 in the form of a roller. This cam follower 227 is adapted to engage the effective surfaces of the cams 228 and 229 which are carried by the drum-supporting side plate 164.

It is evident that as the roller 227 rides over the surfaces of the cams 228 and 229, the lever 225 is rocked one way or the other through the connection of the spool 223. This imparts a corresponding movement to the rod 222 to actuate the bell crank 218 and thus move the actuating crossbar 213 either upwardly or downwardly. Such movement is imparted to the arms 208 through the pins 211 and the indenting fingers 209 on the arms 207 moved inwardly or outwardly—as the case may be.

It is notable that the face of the twister plate 179, which is normally exposed, carries the forming point 230 against which the sides of the dough strip are pressed as they are indented.

Figure 18:
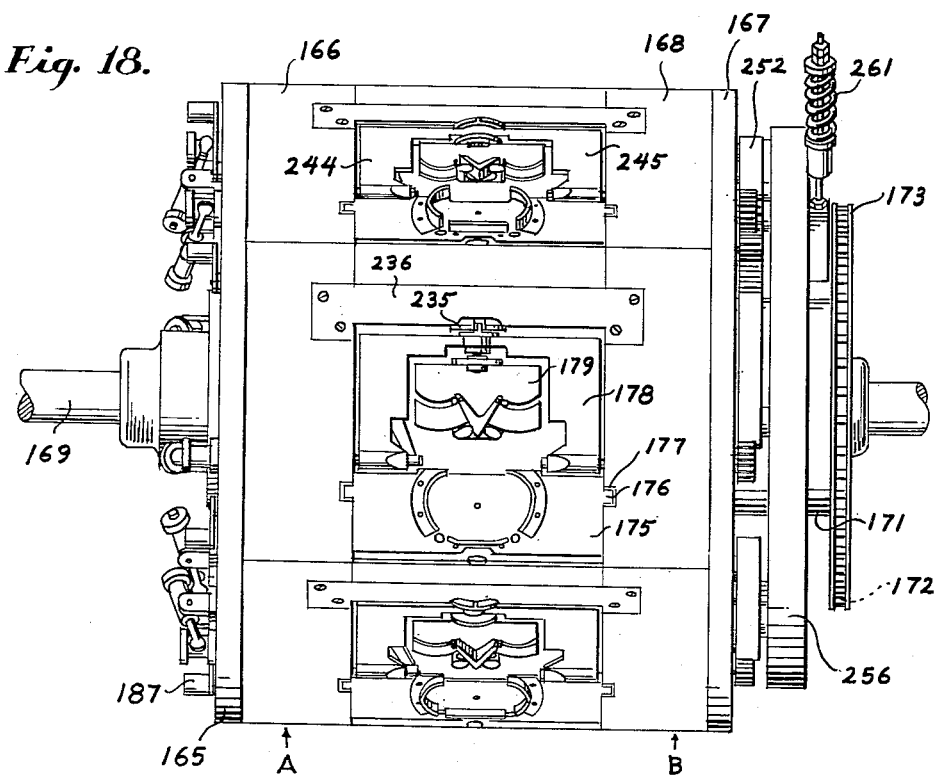
Figure 18 is a view in front elevation looking at the drum.
Figure 29:
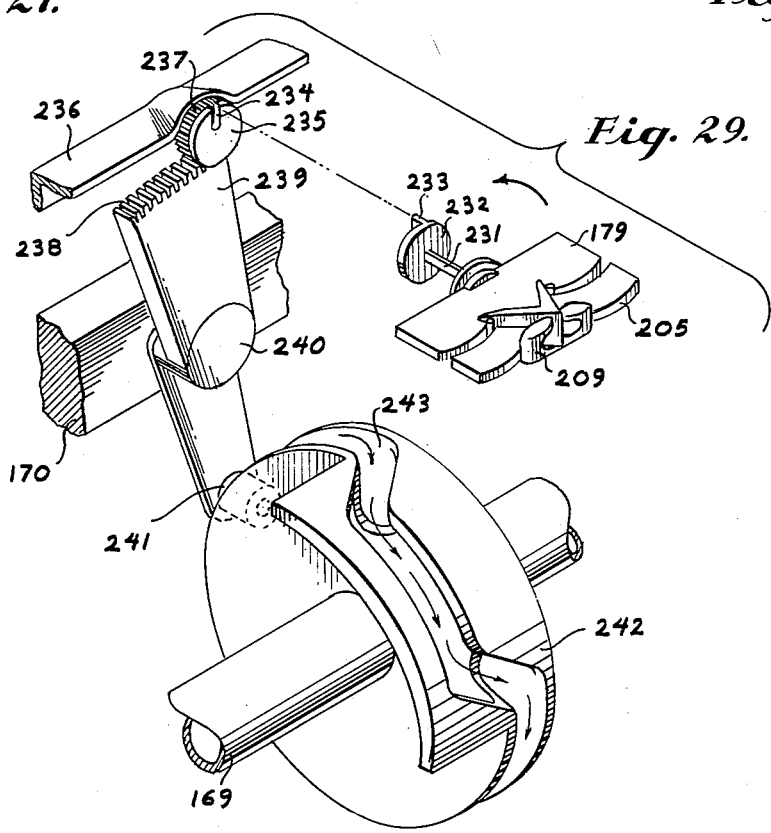
Figure 29 is a perspective illustrating the twister plate, cam, and operating connections therebetween in exploded relation.
Figure 30:
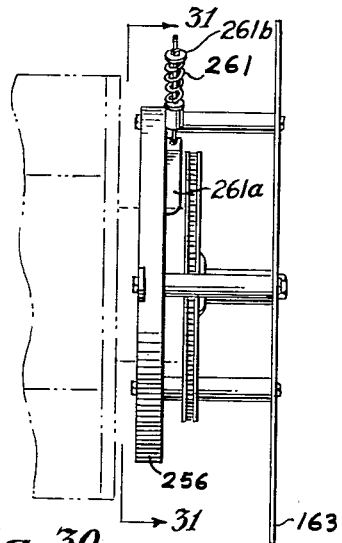
Figure 30 is an elevation illustrating the drive to one end of the drum and the cam located at that end for operating the folding yoke with the drum being represented in broken outline.
Figure 31:
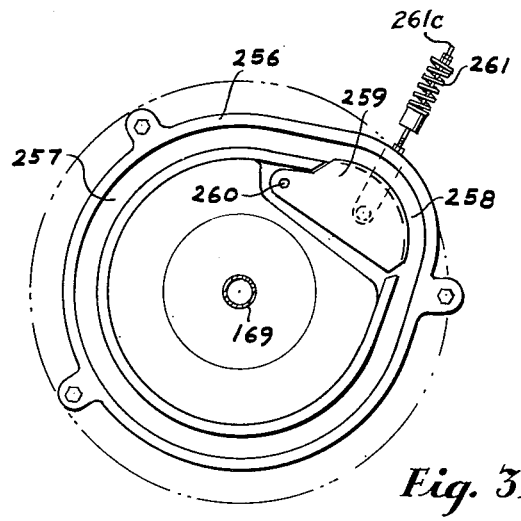
Figure 31 is a detailed showing in elevation of the cam of Figure 30.
Figure 32:
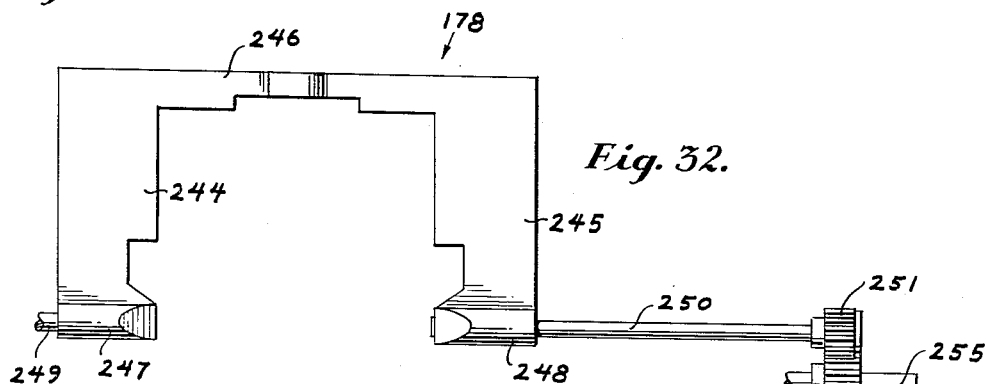
Figure 32 is a detailed elevational showing of the folding yoke.
Figure 33:
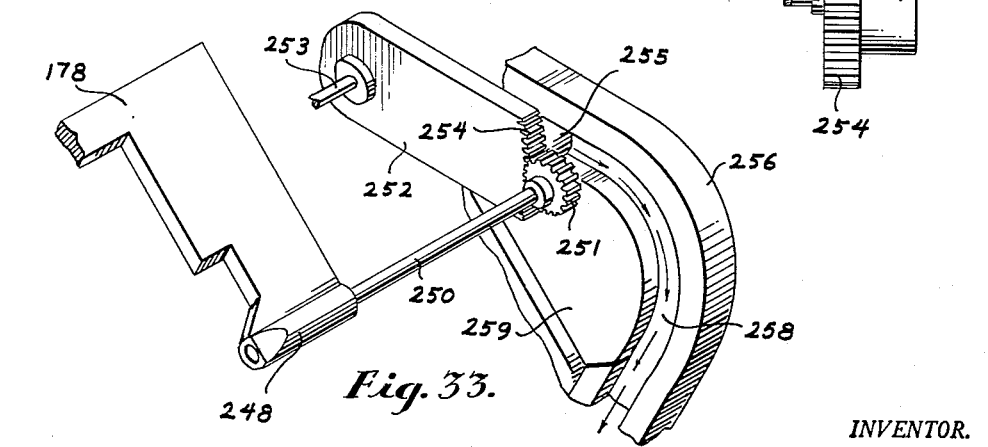
Figure 33 is a detailed perspective of a portion of the folding yoke, a portion of the cam and the operating connections therebetween.

As is clearly illustrated in Figures 18, 20, and 21, the twister plate 179 is pivotally mounted in the folding yoke 178. This pivotal mounting is achieved by a pivot stud 231 (Figure 29) which is journalled in an opening in the central portion of the yoke 178. The twister plate 179 is carried at one end of the stud 231 and the other end carries a clutch member 232 having a rib 233 that is adapted to be received in a groove 234 on a complemental clutch member 235.

Extending across each pair of flats 166 and 168 is an angle bar 236 which carries the clutch member 235, being positioned adjacent to the folding yoke 178 for this purpose. The clutch member 235 is pivotally mounted on the angle bar 236 and its periphery is formed with gear teeth 237. Meshing with the teeth 237 is a gear sector 238 which is formed at one end of a lever 239. Each lever 239 is pivotally mounted, as indicated at 240, on one of the cross-supports 170.

Figure 28:
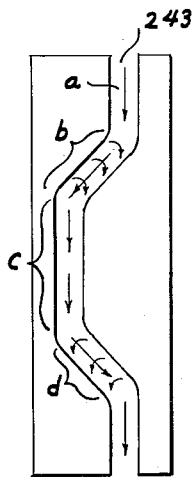
Figure 28 is a diagrammatic view of the cam track of the cam for operating the twister plate.

The end of the lever remote from the gear sector 238 carries a cam follower 241 in the form of a roller. A twisting cam is fixedly mounted on the shaft 169 within the interior of the drum and this twisting cam is designated 242. The twisting cam comprises two complemental members which together define a cam track 243, which is illustrated diagrammatically in Figure 28.

For the major portion of its extent, the cam track 243 is straight and as the roller 241 travels therein as an incident to the rotation of the drum, the lever 239 is not affected. This straight portion of the cam track is represented at a in Figure 28. However, when the roller reaches the inclined part of the cam track at b, the roller 241 is moved laterally to swing the lever 239 and thus cause the gear sector 238 to rotate the gear clutch member 235.

Inasmuch as the clutch members 232 and 235 are in effective engagement during this phase of the operation, the twister plate 179 is rotated through a complete 360°. The roller 241 now enters the straight off-set portion c of the cam track and during this part of its travel the lever is not affected. However, during this travel, the folding yoke is operated, as will be later explained, to disengage the clutch member 232 from the clutch member 235. Thus, when the roller 241 enters the return inclined part of the cam track, represented at d, it is affected to return the lever 239 and gear sector to its original position, but during this movement the twister plate 179 is not affected because of the disengagement of the clutch members 232 and 235. When the folding yoke is returned to its position in which it is ready for the reciprocation of a fresh dough strip, the clutch members are again engaged. Thus, the twister plate 179 is twisted through repeated revolutions of 360° in the same direction without ever having any return movement imparted thereto.

The folding yoke 178 includes two sides 244 and 245 which are joined by a thin back or central portion 246, which together, define the recess which receives the twister plate 179, the central portion 246 lying beneath the clutch member 232 and stud 231. The free edge at the end of each leg 244 and 245 is enlarged to provide trunnion-like structures at 247 and 248. A shaft 249 is journalled in the flat plate 166 of the side piece A and is anchored in the trunnion 247. Likewise, another shaft 250 is anchored in the trunnion 248 and extends across the underface of the flat plate 168 of the side piece B in which it is journalled and through the head 167. The outer end of this shaft 250 drivably carries a pinion 251.

An arm 252 is pivotally mounted, as indicated at 253, on the outer face of the head 167 and the free end of this arm 252 is formed as an arcuate gear sector 254 which meshes with the pinion 251. Mounted on the outer face of the arm 252 is a cam follower 255 which takes the form of a roller.

A folding cam is represented at 256. This cam 256 is disposed about the shaft 169 and is supported from the inner face of the drum-supporting side plate 163 and is in spaced relation with respect to the drum head 167.

The cam 256 includes a track 257 in which the roller 255 travels. The major part of the cam track 257 is a circle, in the center of which lies the axis of the shaft 169, and when the roller 255 travels over this portion of the cam track, due to rotation of the drum, the arm 252 is not affected and there is no rotation of the pinion 251, shaft 250, and the folding yoke 178 is held immovable.

However, when this roller 255 reaches the off-set portion of the cam track, which is represented at 258, the roller 255 is moved outwardly. This causes actuation of the arm 252 to move the gear sector 254 and thus rotate the pinion 251 and swing the folding yoke 178 on the shafts 249 and 250 as pivots. After the peak of the off-set portion 258 is reached, the roller begins its return movement which causes a corresponding return swinging action of the folding yoke 178.

The portion 258 of the cam track 257 is defined on its inner side by a piece 259 which lies within an opening provided in the main body of the cam and which piece is pivotally mounted to said body as indicated at 260. The piece 259 is held in restraint and urged outwardly toward the periphery of the cam 256 by means of a tension coil spring 261 mounted on a support bracket 261a attached to the outward face of the piece 259. The said spring is held in compression by means of a disk 261b threadably secured to a rod 261c passing through said coil spring and forming part of the support bracket. Thus, the natural tendency of the coil spring 261 to resist compression provides a force on said disk which urges it outwardly, which in turn causes the piece 259 to be urged outwardly toward the cam periphery, thus affording definite assurance that the folding yoke 178 will be completely closed on each cycle of operation.

Drum operation

Figure 19:
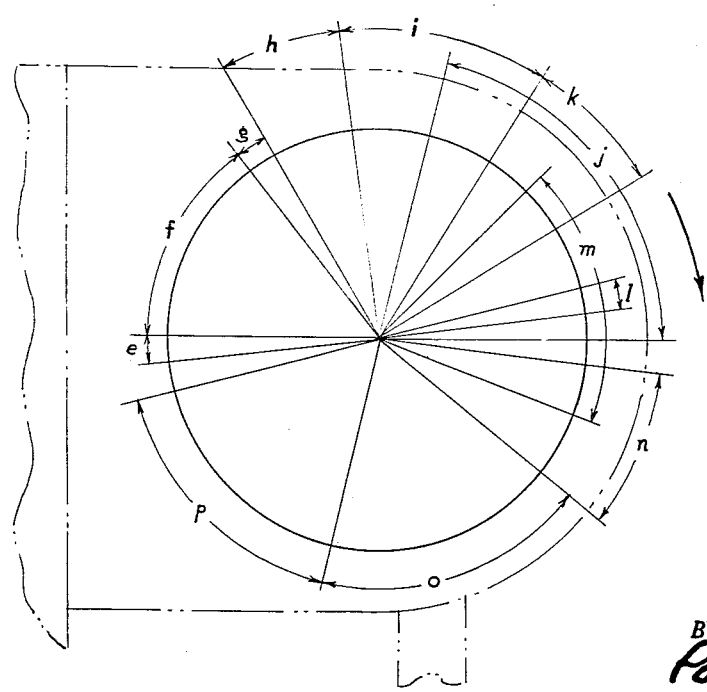
Figure 19 is a diagrammatic showing which correlates the various operations of each forming unit in forming a pretzel.

Referring now more particularly to Figure 19, the sequence in which the several devices in each of the forming units of the drum is operated will be outlined. Figure 19 is a diagrammatic view with a complete revolution of 360°, broken up into angular sectors representing the several intervals where the different operations take place. A cycle of operation will be described, assuming that the drum, as depicted in Figure 19, rotates in a clockwise direction.

When the roller 227 first strikes the inclined lower end of the cam 228, the fingers 209 are opened into an expanded position so that the dough strip 262 may be received over the segments 180, 181, and 182 and fall into the inverted U-shape depicted in Figure 13 with the legs of the U within the fingers. The interval during which the fingers are actually opened is represented at $e$ and the interval during which the fingers remain open is represented by the sector $f$.

As the dough strip is received on the forming unit and assumes the inverted U-shape above described the roller 227 rides off the upper inclined end of the cam 228, thus closing the fingers. The time during which the fingers close is represented by the angular sector $g$.

Immediately after the fingers are closed to indent the legs in the manner shown in Figure 14, the roller 241 enters the part $b$ of the cam track 243 so that the twister plate 178 is twisted through a full 360°. The interval during which this twisting action takes place is depicted by the angular sector $h$. After the twist is accomplished, the roller 241 remains in the straight portion $c$ of the track 243 an appreciable distance. This is represented by the sector $i$. However, after the twist is accomplished and while the gear sector 238 is still held immovable, the folding yoke 178 is folded upwardly to fold the dough strip into the shape illustrated in Figure 16. The folding yoke is first folded upwardly and then returned with an almost continuous movement. The interval during which the folding yoke is so operated is represented by the sector $j$.

Once the folding action is started, the clutch members 232 and 235 are disengaged by virtue of the pivotal movement of the folding yoke 178 whose central portion 246 lies beneath the stud 231 and clutch member 232. Thus the folding yoke acts on the clutch member 232 to slidably disengage the rib 233 from the slot 234 in the other clutch member 235. Thus, when the roller 241 reaches the section $d$ of the cam track 243, the gear sector 248 is returned to its original position. The interval during which this returning action takes place is depicted at $k$.

After the folding yoke has been operated to fold the pretzel into the shape depicted in Figure 16, the pasters 183 are actuated by engagement of the roller 187 with the cam 188. The interval during which this action takes place is represented by the sector $l$.

In order that a formed pretzel may be ejected, it is necessary that the fingers 209 be partially opened. This action is performed by the cam 229 and the interval during which the fingers are so partially opened is represented by the sector $m$. During the interval represented by the sector $n$, the base plate 175 is held outwardly and the ejector devices are operated by the cam 193.

After ejection of a formed pretzel, the base plate 175 is moved inwardly and held in this position over the interval represented at $o$ and then moved outwardly into position to receive another dough strip over the interval represented at $p$. The above cycle is repeated for each forming unit with each forming unit forming one pretzel on one cycle of operation.

Pretzel conveyor

Substantially centrally of the machine and extending from a point below the drum at the rear end to a higher point at the front end, is a conveyor belt for formed pretzels. The conveyor belt is referred to in its entirety by the reference character C. It includes a rear top-ply portion 262 which passes over idler rollers 263 and 264, as shown in Figure 4. It is this top-ply portion 262 which receives the pretzels from the drums.

After passing over the idler roller 264, the top-ply of the conveyor belt C passes around a driving roller 265 mounted on a shaft 266. Drivably carried by this shaft 266 is a sprocket 268 (see Figure 5). A chain 269 passes over the sprocket 268 and over another sprocket 270 drivably carried by the shaft 137. As the shaft 137 is driven from the gear box 20, the driving roller 265 is driven through the medium of shaft 266, sprocket 268, chain 269, and sprocket 270.

After passing around the driving roller 265, the top-ply of the conveyor belt C passes over another idler roller 271. The top-ply now assumes an upward direction and takes the inclined path depicted in Figure 4, passing over the several idler supporting rollers illustrated, until it reaches the front roller 272. The bottom-ply then continues back in substantially the same manner, passing around a lower idler roller 273 that is spaced from the driving roller 265. It is evident that this conveyor belt takes formed pretzels from the drum and delivers them to an up-raised point at the front end of the machine. Moreover, this raising of the pretzel does not require any additional length or extent in the machine and makes it possible to maintain the compact construction illustrated.

There are occasions when it is desirable to rotate the drum and operate the depositor without operating the other parts of the machine. For this purpose a hand wheel is provided at 274 on the right-hand end of the shaft 137. Also, a clutch is included as a part of the shaft 178 and represented at 275. This clutch is operated by the handle shown at 276 in Figure 3 through appropriate mechanical linkage.

The gear box 20 is adjustable to vary the gear ratios afforded thereby. To accomplish this, an adjusting sprocket is included as a part of the gear box and is shown at 277. A chain 278 passes over this sprocket 277 and over another sprocket carried by an adjusting hand wheel 279. The latter is located in a position conveniently close to the hand wheel 274 so as to be available to the operator.

While a preferred specific embodiment of the invention is hereinbefore set forth, it is to be clearly understood that the invention is not to be limited to the exact construction, mechanisms, and devices illustrated and described because various modifications of these details may be provided, in putting the invention into practice within the purview of the appended claims.

What is claimed is:

1. In a pretzel twisting machine including a drum mounted for rotation about a fixed horizontal shaft and having a plurality of forming units incorporated therein, together with a cross-support for each forming unit secured to said drum, each of said forming units including a twister plate pivotally carried thereby, a cam fixedly mounted on said shaft within the interior of said drum and providing a cam track, a lever pivotally mounted on each of said cross-supports, a cam follower on one end of each of said levers and disposed on said cam track, and operative connections between the other end of each of said levers and its respective twister plate for causing pivotal revolution of said twister plates.

2. In a pretzel twisting machine including a drum mounted for rotation about a fixed horizontal shaft and having a plurality of forming units incorporated therein, together with a cross-support and angle bar for each forming unit secured to said drum, each of said forming units including a twister plate pivotally carried thereby, a lever pivotally mounted on each cross-support, a cam follower at one end of each of said levers with all said cam followers disposed on said cam track, the other end of each of said levers being provided with gear teeth to provide a gear sector, a clutch member pivotally carried by each angle bar and having gear teeth meshing with said gear sector, and a complemental clutch member carried by each twister plate and adapted to engage the corresponding clutch member on said angle bar to establish a rotative drive to said twister plate.

3. In a pretzel twisting machine including a drum mounted for rotation about a fixed horizontal shaft and having a plurality of forming units incorporated therein, together with a cross-support and angle bar for each forming unit secured to said drum, each of said forming units including a twister plate pivotally carried thereby, a lever pivotally mounted on each cross-support, a cam follower at one end of each of said levers with all said cam followers disposed on said cam track, the other end of each of said levers being provided with gear teeth to provide a gear sector, a shaft carrying each twister plate and pivotally mounted in one of said folding yokes, a complemental clutch member drivably carried by each of said last mentioned shafts and normally engaging one of said first clutch members, and means for operating said folding yoke to break the engagement between said clutch members.

4. In a pretzel twisting machine including a drum mounted for rotation about a fixed horizontal axis and having a plurality of forming units incorporated therein, with each forming unit including a folding yoke, the improvement consisting of a fixed cam mounted in spaced relation to the axis of the drum exteriorly and to one side thereof, said cam providing a trackway for a cam follower, a cam track piece pivotally mounted on said cam and having an edge defining a portion of said trackway, said cam track piece being adapted for swinging radially outward of the cam axis, spring means biasing said cam track piece radially outwardly of the cam axis so that the cam follower will be resiliently urged to follow the outward swing thereof, a roller cam follower movable in said trackway, and means connected to said follower for causing pivotal movement of the folding yokes.

5. In a pretzel twisting machine including a drum mounted for rotation about a fixed horizontal axis and having a plurality of forming units incorporated therein, with each forming unit including a folding yoke, the improvement consisting of a shaft located at the axis of rotation of each folding yoke and drivably connected thereto, said shaft residing within said drum and having one end disposed exteriorly thereof at one side, a pinion on said end of the shaft, an arm pivotally attached to the exterior of said drum at the pinion side thereof and having one end formed as a gear sector, the said gear sector being in enmeshment with said pinion, a roller cam follower on each of said arms on the side thereof remote from said drum, and a fixed cam mounted in spaced relation to the axis of said drum exteriorly and to one side thereof, the said cam providing a trackway receiving said cam follower.

6. In a pretzel twisting machine including a drum mounted for rotation about a fixed horizontal axis and having a plurality of forming units incorporated therein, with each forming unit including a folding yoke, the improvement consisting of a shaft located at the axis of rotation of each folding yoke and drivably connected thereto, said shaft residing within said drum and having one end disposed exteriorly thereof at one side, a pinion on said end of the shaft, an arm pivotally attached to the exterior of said drum at the pinion side thereof and having one end formed as a gear sector, the said gear sector being in enmeshment with said pinion, a roller cam follower on each of said arms on the side thereof remote from said drum, a fixed cam mounted in spaced relation to the axis of said drum exteriorly and to one side thereof, said cam providing a trackway for said cam follower, a cam track piece pivotally mounted on said cam and having an edge defining a portion of said trackway, said cam track piece being adapted for swinging radially outward of the cam axis, and spring means normally biasing said cam track piece radially outward of the cam axis so that the cam follower will be resiliently urged to follow the outward swing thereof.

7. In a pretzel twisting machine including a pair of vertically spaced supporting plates, a fixed horizontal shaft extending therebetween, a drum journalled on said shaft for rotation thereabout and having a plurality of forming units incorporated therein, with each forming unit including a folding yoke, a fixed cam carried by one of said supporting plates on the side thereof remote from said drum, the said cam lying in spaced relation to the axis of said drum and providing a trackway for a cam follower, a cam follower for each folding yoke movable in said trackway, attachment means connecting each follower to its respective yoke, a cam track piece pivotally mounted on said cam and having an edge defining a portion of said trackway, said cam track piece being adapted for swinging radially outward of the cam axis, and spring means normally biasing said cam track piece radially outward of the cam axis so that the cam follower will be resiliently urged to follow the outward swing thereof.

References Cited in the file of this patent

UNITED STATES PATENTS

| | | |
|---|---|---|
| 1,142,533 | Schaetzel | June 8, 1915 |
| 1,164,947 | McCandless | Dec. 21, 1915 |
| 1,352,826 | Michalek | Sept. 14, 1920 |
| 1,870,256 | Lauterbur et al | Aug. 9, 1932 |
| 1,879,944 | Muth | Sept. 27, 1932 |
| 1,957,135 | Fabian | May 1, 1934 |
| 2,026,526 | Gipe | Jan. 7, 1936 |
| 2,090,291 | Gipe | Aug. 17, 1937 |
| 2,295,246 | Weida | Sept. 8, 1942 |
| 2,342,093 | Weida | Feb. 15, 1944 |
| 2,343,515 | McAnderson | Mar. 7, 1944 |